United States Patent
Ishihara et al.

(10) Patent No.: US 12,106,017 B2
(45) Date of Patent: Oct. 1, 2024

(54) CONSTRUCTION MACHINE

(71) Applicant: HITACHI CONSTRUCTION MACHINERY CO., LTD., Tokyo (JP)

(72) Inventors: Shinji Ishihara, Tokyo (JP); Shiho Izumi, Tsuchiura (JP); Shinichi Kotake, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 520 days.

(21) Appl. No.: 17/607,914

(22) PCT Filed: May 28, 2020

(86) PCT No.: PCT/JP2020/021204
§ 371 (c)(1),
(2) Date: Nov. 1, 2021

(87) PCT Pub. No.: WO2020/246369
PCT Pub. Date: Dec. 10, 2020

(65) Prior Publication Data
US 2022/0222392 A1    Jul. 14, 2022

(30) Foreign Application Priority Data

Jun. 6, 2019  (JP) .................................. 2019-106447

(51) Int. Cl.
| E02F 3/43 | (2006.01) |
| E02F 3/30 | (2006.01) |
| E02F 3/36 | (2006.01) |
| E02F 9/12 | (2006.01) |
| E02F 9/20 | (2006.01) |
| G01S 19/43 | (2010.01) |
| G01S 19/47 | (2010.01) |

(Continued)

(52) U.S. Cl.
CPC ................ G06F 30/17 (2020.01); E02F 3/30 (2013.01); E02F 3/36 (2013.01); E02F 9/121 (2013.01);
(Continued)

(58) Field of Classification Search
CPC ...................................................... E02F 3/437
See application file for complete search history.

(56) References Cited

U.S. PATENT DOCUMENTS

| 2005/0071064 | A1 * | 3/2005 | Nakamura | ............ F04B 49/002 |
| | | | | 701/50 |
| 2005/0080559 | A1 | 4/2005 | Ishibashi et al. | |

(Continued)

FOREIGN PATENT DOCUMENTS

| CN | 107407077 A | * 11/2017 | ................ E02F 3/32 |
| CN | 107407077 B | * 7/2021 | ................ E02F 3/32 |

(Continued)

OTHER PUBLICATIONS

International Search Report of PCT/JP2020/021204 dated Aug. 18, 2020.

(Continued)

*Primary Examiner* — Shelley Chen
(74) *Attorney, Agent, or Firm* — MATTINGLY & MALUR, PC

(57) ABSTRACT

A position/posture computing section determines that an azimuth of an upper swing structure calculated at a GNSS receiver is of low quality when at least one of a posture angle of the upper swing structure acquired at a machine-body IMU and a posture angle of a front work implement acquired at a boom IMU is equal to or larger than a threshold value, executes a bias removal computation on the basis of the quality of the azimuth and the azimuth of the upper swing structure calculated at the GNSS receiver, calculates a corrected azimuth of the upper swing structure on the basis of the azimuth of the upper swing structure calculated at the GNSS receiver, and an angular velocity of the upper swing structure from which a gyro bias has been removed, and (Continued)

computes a three-dimensional position and posture of the front work implement by using the corrected azimuth.

8 Claims, 16 Drawing Sheets

(51) Int. Cl.
  *G01S 19/54* (2010.01)
  *G06F 30/17* (2020.01)
  *G06F 30/20* (2020.01)
  *G06F 119/02* (2020.01)

(52) U.S. Cl.
  CPC .............. *E02F 9/20* (2013.01); *G01S 19/43* (2013.01); *G01S 19/47* (2013.01); *G01S 19/54* (2013.01); *G06F 30/20* (2020.01); *G06F 2119/02* (2020.01)

(56) References Cited

U.S. PATENT DOCUMENTS

| | | |
|---|---|---|
| 2014/0122016 A1 | 5/2014 | Friend |
| 2014/0297040 A1 | 10/2014 | Baba et al. |
| 2016/0138240 A1* | 5/2016 | Ikegami .................. E02F 9/26 60/420 |
| 2018/0106016 A1* | 4/2018 | Uji ........................ G05B 19/042 |
| 2018/0282969 A1* | 10/2018 | Hita ...................... F15B 19/002 |

FOREIGN PATENT DOCUMENTS

| | | | | |
|---|---|---|---|---|
| CN | 108699814 B | * | 4/2022 | .......... B64C 39/024 |
| JP | 06-341847 A | | 12/1994 | |
| JP | 2004-125580 A | | 4/2004 | |
| JP | 3569015 B2 | * | 9/2004 | |
| JP | 3767372 B2 | * | 4/2006 | |
| JP | 4210012 B2 | * | 1/2009 | |
| JP | 2016-224038 A | | 12/2016 | |
| JP | 2017-110998 A | | 6/2017 | |
| WO | 2014/061790 A1 | | 4/2014 | |
| WO | WO-2020246369 A1 | * | 12/2020 | ................ E02F 3/30 |

OTHER PUBLICATIONS

Translation of the International Preliminary Report on Patentability dated Dec. 16, 2021, received in corresponding International Application No. PCT/JP2020/021204.

* cited by examiner

CONSTRUCTION MACHINE

TECHNICAL FIELD

The present invention relates to a construction machine such as a hydraulic excavator having an upper swing structure which is rotatable relative to its lower travel structure.

BACKGROUND ART

As hydraulic excavators are demanded to support computerized construction, there is ongoing development of hydraulic excavators having functionalities of machine guidance by which the position and posture of an articulated-type front work implement is displayed to an operator and for machine control by which the position and posture of the front work implement is controlled such that the front work implement moves along a target construction surface.

In order for such a hydraulic excavator to support three-dimensional computerized construction (3D computerized construction), it is necessary to provide the position (coordinates) and direction (direction of the front work implement) of the hydraulic excavator itself in a construction site. In order to provide these types of information, hydraulic excavators that have two GNSS (Global Navigation Satellite System) antennas attached to their upper swing structure and that perform GNSS positioning have been developed conventionally.

It becomes impossible for hydraulic excavators that perform GNSS positioning by using two GNSS antennas to implement the GNSS positioning normally when the GNSS antennas cannot capture a necessary amount of satellite signals. Since information about the position and direction cannot be provided in such a state, suspension of operation of machine guidance and machine control cannot be avoided, and the work efficiency can be deteriorated.

Patent Document 1 discloses a technology that makes it possible to receive correction data transmitted, through wireless communication, from a base station prepared in a construction site, and implement RTK (Real Time Kinematic) positioning about positional information in addition to GNSS positioning by using two GNSS antennas, and to calculate an azimuth of a machine body (upper swing structure) of a hydraulic excavator, and measure positional information by using the azimuth when the RTK positioning is abnormal, by providing yaw angle measuring means such as a gyro.

PRIOR ART DOCUMENT

Patent Document

Patent Document 1: JP-2004-125580-A

SUMMARY OF THE INVENTION

Problems to be Solved by the Invention

When an azimuth of a machine body (upper swing structure) is calculated by using two GNSS antennas, one of the two GNSS antennas is used as a main antenna, the other one is used as a sub antenna, and RTK positioning is typically performed between the main and sub antennas. Thereby, no matter whether or not communication with a base station installed at a construction site is possible, it is possible to implement the RTK positioning for the azimuth of the machine body.

Meanwhile, since a front work implement of a hydraulic excavator includes a metallic member, it is possible that GNSS satellite signals are reflected or interrupted by the front work implement.

In addition, since the front work implement repeats vertical operation in excavation operation of the hydraulic excavator, the hydraulic excavator is located in a GNSS-use environment where reflection or stoppage of satellite signals occurs repeatedly. In such a use environment, satellites are arranged in a significantly unbalanced manner, and thus the precision of computation of an azimuth of the machine body is deteriorated.

Then, since the hydraulic excavator performs raising and lowering work of the front work implement frequently, azimuths of the machine body calculated by the GNSS undesirably vary even if the upper swing structure remains unswung. If the calculation results are used for machine guidance, it undesirably appears that the upper swing structure is operating unsteadily.

Note that, in order to implement RTK positioning, at least four or more satellites may be captured. Because of this, simply raising and lowering a work implement as described above rarely makes it impossible to implement the RTK positioning itself that uses correction data from a base station, and a GNSS receiver continues normal positioning (RTK-Fix state).

Because of this, the technology of Patent Document 1 that implements a countermeasure when RTK positioning becomes abnormal cannot solve the problems mentioned above. That is, if only calculations of azimuths are considered, the scene where GNSS positioning becomes abnormal is different from that in Patent Document 1, and the technology of Patent Document 1 cannot prevent deterioration of the precision of computation of azimuths of a machine body (upper swing structure) due to postural changes in a construction machine such as raising and lowering of a front work implement.

Note that if two GNSS antennas are arranged next to each other in a line in the forward and backward direction, an interrupted area does not become left-right symmetrical (see FIG. 15B and FIG. 15C mentioned below), and the phenomenon described above becomes less severe to some extent, but the phenomenon itself in which such an interrupted area is generated is not solved. Therefore, this does not become the fundamental solution to the problems described above.

In addition, if the GNSS antennas are made taller than the highest point of the front work implement, there will be no influence of interruption by the front work implement. However, if the GNSS antennas are made longer, the GNSS antennas structurally vibrate undesirably, and this rather creates a risk of deterioration of the positioning precision.

The present invention has been made to solve the problems mentioned above, and an object of the present is to provide a construction machine that enables calculation of an accurate azimuth of a machine body by using a GNSS regardless of postural changes in a front work implement such as raising or lowering of the front work implement.

Means for Solving the Problem

In order to solve the problems described above, the present invention provides a construction machine including: a lower travel structure; an upper swing structure that is swingable relative to the lower travel structure; an articulated-type front work implement attached vertically rotatably relative to the upper swing structure; a GNSS system having two GNSS antennas attached to the upper swing structure, and a GNSS receiver that calculates three-dimensional coordinates of the GNSS antennas and an azimuth of the upper swing structure on a basis of a satellite signal received by the GNSS antennas; an angular velocity acquiring apparatus that is attached to the upper swing structure, and acquires an angular velocity of the upper swing structure; a machine-body posture angle acquiring apparatus that is attached to the upper swing structure, and acquires a posture angle of the upper swing structure; a front-implement posture angle acquiring apparatus that acquires a posture angle of the front work implement; and a controller, the controller being configured to compute a position and posture of the front work implement on a basis of the three-dimensional coordinates of the GNSS antennas and the azimuth of the upper swing structure that are calculated at the GNSS receiver, the posture angle of the upper swing structure acquired at the machine-body posture angle acquiring apparatus, the angular velocity of the upper swing structure acquired at the angular velocity acquiring apparatus and the posture angle of the front work implement acquired at the front-implement posture angle acquiring apparatus, and control operation of the front work implement on a basis of the position and posture of the front work implement, wherein the controller is further configured to: determine quality of the azimuth of the upper swing structure calculated at the GNSS receiver on a basis of at least one of the posture angle of the upper swing structure acquired at the machine-body posture angle acquiring apparatus and the posture angle of the front work implement acquired at the front-implement posture angle acquiring apparatus; execute a bias removal computation of removing a gyro bias from the angular velocity of the upper swing structure acquired at the angular velocity acquiring apparatus on a basis of a result of the determination about the quality of the azimuth, and the azimuth of the upper swing structure calculated at the GNSS receiver, and determine presence or absence of swing operation of the upper swing structure on a basis of the angular velocity of the upper swing structure from which the gyro bias has been removed; and calculate a corrected azimuth of the upper swing structure on a basis of the azimuth of the upper swing structure calculated at the GNSS receiver, the angular velocity of the upper swing structure from which the gyro bias has been removed and a result of the determination about swing operation of the upper swing structure, and compute the position and posture of the front work implement by using the corrected azimuth.

Advantages of the Invention

According to the present invention, it is possible to calculate an accurate azimuth of an upper swing structure by using a GNSS regardless of postural changes in a construction machine such as raising and lowering of a front work implement, and to acquire the azimuth of the upper swing structure with high precision and robustness.

MODES FOR CARRYING OUT THE INVENTION

Hereinafter, embodiments of the present invention are explained according to the figures.

First Embodiment

Figure 1:
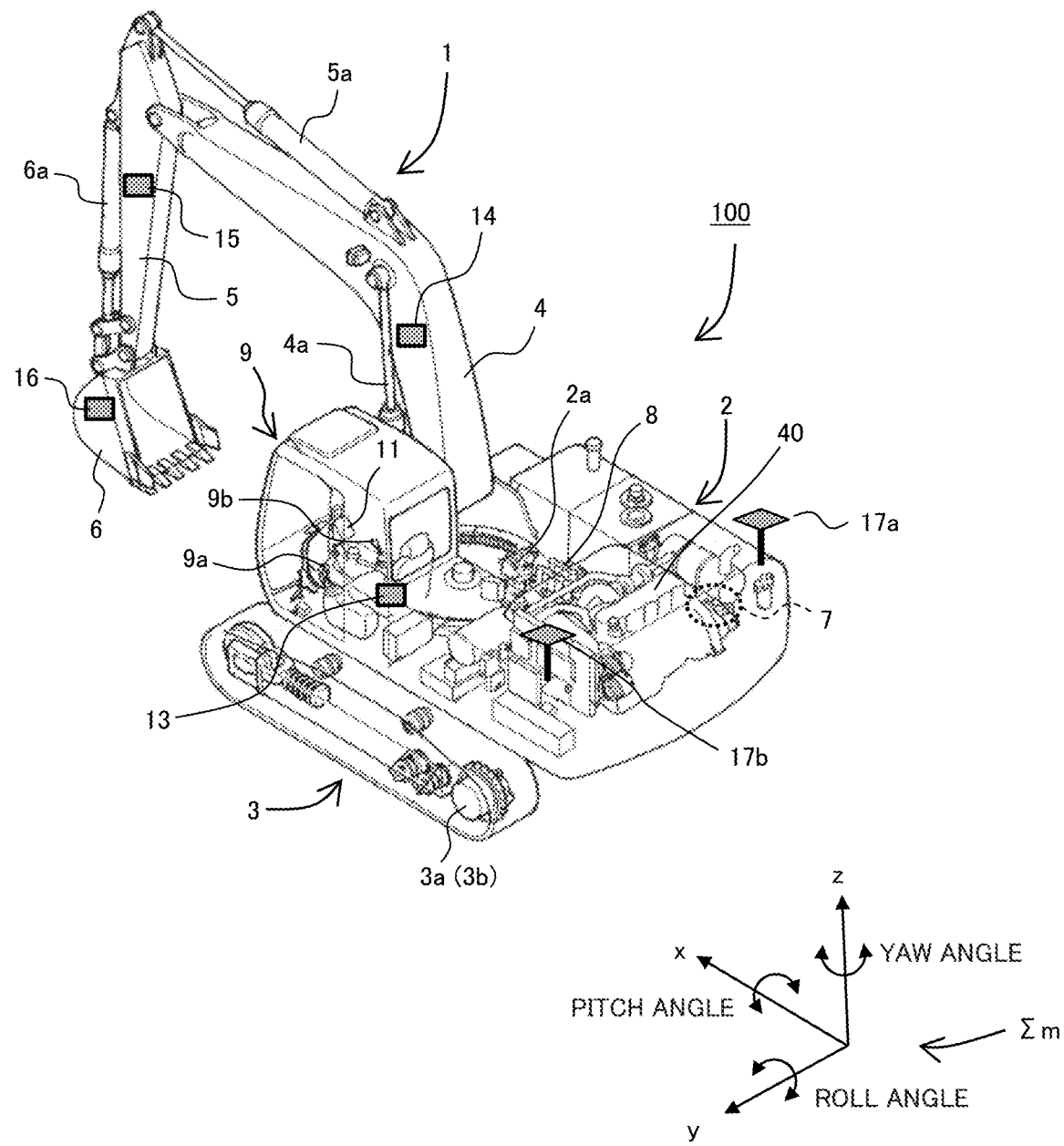
FIG. 1 is a figure depicting an external appearance and a part of an internal structure of a hydraulic excavator which is an example of a construction machine according to embodiments of the present invention.

FIG. 1 is a figure depicting an external appearance and a part of an internal structure of a hydraulic excavator which is an example of a construction machine according to the present invention.

In FIG. 1, a hydraulic excavator 100 includes: an articulated-type front work implement 1 including a boom 4, an arm 5, and a bucket (work device) 6 that are a plurality of driven members to be pivoted vertically, and are coupled with each other; and an upper swing structure 2 and a lower travel structure 3 included in a machine body. The upper swing structure 2 is mounted swingably relative to the lower travel structure 3. In addition, the base end of the boom 4 of the front work implement 1 is vertically pivotably supported by a front section of the upper swing structure 2, one end of the arm 5 is vertically pivotably supported at the tip of the boom 4, and the bucket 6 is vertically pivotably supported at the other end of the arm 5. The boom 4, the arm 5, the bucket 6, the upper swing structure 2, and the lower travel structure 3 are driven by a boom cylinder 4a, an arm cylinder 5a, a bucket cylinder 6a, a swing motor 2a, and left and right travel motors 3a and 3b, respectively, which are hydraulic actuators.

The boom 4, the arm 5, and the bucket 6 operate on a plane including the front work implement 1, and hereinafter the plane is referred to as an operation plane in some cases. That is, the operation plane is a plane orthogonal to the pivot axes of the boom 4, the arm 5, and the bucket 6, and can be set at the widthwise center positions of the boom 4, the arm 5, and the bucket 6.

In a cabin 9 (*cab*) which an operator gets in, operation lever devices 9a and 9b that generate operation signals for operating the hydraulic actuators 2a and 4a to 6a, a monitor 11, and the like are installed.

The operation lever devices 9a and 9b are so-called electric levers. Each of them includes an operation lever that can be inclined forward, backward, leftward and rightward, and a sensor that is not depicted and electrically detects a lever operation amount which is an inclination amount of the operation lever. The sensor outputs the sensed lever operation amount as an electric operation signal via an electric wire to a controller 20 which is a control system. In addition, operation commands for the hydraulic actuators 2a and 4a to 6a are allocated to forward and backward operation and leftward and rightward operation of the operation levers of the operation lever devices 9a and 9b.

Operation control of the swing motor 2a, the boom cylinder 4a, the arm cylinder 5a, and the bucket cylinder 6a is performed by controlling individual spools in a control valve 8 to control the direction and flow rate of a hydraulic operating fluid supplied to the hydraulic actuators 2a and 4a to 6a from a hydraulic pump apparatus 7 driven by a prime mover 40 such as an engine or an electrically driven motor. The spools in the control valve 8 are operated by drive signals (pilot pressures) output via solenoid proportional valves 10a, 10b . . . (see FIG. 2) from a pilot pump which is not depicted. The controller 20 generates control signals on the basis of the operation signals output from the operation lever devices 9a and 9b, outputs the control signals to the solenoid proportional valve 10a and 10b . . . to thereby cause drive signals (pilot pressures) to be output to the individual spools in the control valve 8 from the solenoid proportional valves 10a, 10b . . . , and controls operation of each of the hydraulic actuators 2a to 6a.

Note that the operation lever devices 9a and 9b may be hydraulic pressure pilot type lever devices. In this case, each of the operation lever devices 9a and 9b generates a pilot pressure according to an operation direction and operation amount of its operation lever, the pilot pressure is supplied directly to the control valve 8 as a drive signal, and operation of each of the hydraulic actuators 2a to 6a is controlled.

An inertial measurement unit (IMU: Inertial Measurement Unit) 13 is arranged at the upper swing structure 2.

The inertial measurement unit 13 measures angular velocities and acceleration of the upper swing structure 2. In the present invention, the inertial measurement unit 13 is included in an angular velocity acquiring apparatus that acquires angular velocities of the upper swing structure.

Angular velocities of the upper swing structure 2 measured by the inertial measurement unit 13 include an angular velocity in the forward and backward direction of the upper swing structure 2, an angular velocity in the leftward and rightward direction of the upper swing structure 2, and an angular velocity in the swing direction of the upper swing structure 2.

In addition, by integrating the measured angular velocity in the forward and backward direction of the upper swing structure 2, the measured angular velocity in the leftward and rightward direction of the upper swing structure 2, and the measured angular velocity in the swing direction of the upper swing structure 2 over time, it is possible to measure an inclination in the forward and backward direction (pitch angle) of the upper swing structure 2, an inclination in the leftward and rightward direction (roll angle) of the upper swing structure 2 and an inclination in the swing direction (yaw angle) of the upper swing structure 2, respectively. That is, in the present invention, the inertial measurement unit 13 is included not only in the angular velocity acquiring apparatus, but also in a machine-body posture angle acquiring apparatus that acquires posture angles of the upper swing structure 2.

Note that a method that uses acceleration may be used for the acquisition of the posture angles. Specifically, supposing that the upper swing structure 2 at which the inertial measurement unit 13 is arranged is stationary, by comparing a vertical direction (i.e. a direction in which gravitational acceleration is applied) in a machine-body coordinate system set for the inertial measurement unit 13 with acceleration actually sensed by the inertial measurement unit 13, it is possible to sense an inclination in the forward and backward direction (pitch angle) of the upper swing structure 2, and an inclination in the leftward and rightward direction (roll angle) of the upper swing structure 2.

In FIG. 1, $\Sigma m$ represents a machine-body coordinate system. The machine-body coordinate system $\Sigma m$ is a three-dimensional orthogonal coordinate system set for the upper swing structure 2. As an example of it, the machine-body coordinate system $\Sigma m$ is an orthogonal coordinate system having: an origin at the intersection between an axis S (see FIG. 2) of the center of swing of the upper swing structure 2, and the top surface of the base frame (swing frame) of the upper swing structure 2; a z axis (see FIG. 2) along the axis S of the center of swing; an x axis along an axis in the forward and backward direction orthogonal to the z axis; and a y axis along an axis in the leftward and rightward direction orthogonal to the z axis and the x axis.

The angular velocity in the forward and backward direction of the upper swing structure 2 mentioned above is an angular velocity about the y axis of the machine-body coordinate system $\Sigma m$, the angular velocity in the leftward and rightward direction of the upper swing structure 2 mentioned above is an angular velocity about the x axis of the machine-body coordinate system $\Sigma m$, and the angular velocity in the swing direction of the upper swing structure 2 mentioned above is an angular velocity about the z axis of the machine-body coordinate system Σm. In addition, the inclination in the forward and backward direction of the upper swing structure 2 is an inclination about the y axis (pitch angle) of the machine-body coordinate system Σm, the inclination in the leftward and rightward direction of the upper swing structure 2 is an inclination about the x axis (roll angle) of the machine-body coordinate system Σm, and the inclination in the swing direction of the upper swing structure 2 is an inclination about the z axis (yaw angle) of the machine-body coordinate system Σm.

Note that it is supposed about use of a sensor in the present embodiment that functionalities for computation of these inclinations (angles) are implemented in the inertial measurement unit, but it is needless to say that when angle calculation functionalities are not built in the inertial measurement unit 13, the present invention can be realized by preparing angle computation functionalities in the controller 20.

Two GNSS antennas 17a and 17b are attached to the upper swing structure 2. A satellite signal received at each of the GNSS antennas 17a and 17b is subjected to execution of various types of positioning computation such as calculation of three-dimensional coordinates of the GNSS antennas 17a and 17b or calculation of an azimuth of the upper swing structure 2 at a GNSS receiver 17c (see FIG. 2, FIG. 3, etc.). In the GNSS receiver 17c, the three-dimensional coordinates of the GNSS antenna 17a and 17b are computed as coordinate values in a global coordinate system. In addition, in the present embodiment, one of the two GNSS antennas 17a and 17b is used as a main antenna, and the other one is used as a sub antenna. The GNSS receiver 17c implements RTK (Real Time Kinematic) positioning between these main and sub antennas. Because of this, even if there is no wireless communication connection with a base station installed at a construction site or no matter whether or not wireless communication with the base station is possible, it is possible to implement the RTK positioning for the azimuth of the upper swing structure 2. On the other hand, regarding positional information of the three-dimensional coordinates, RTK positioning that uses correction information transmitted from the base station through wireless communication connection with the base station installed at the construction site or correction information distributed through a network is implemented to acquire the positional information.

In the following, for simplification of explanation, the GNSS antennas 17a and 17b and the GNSS receiver 17c are collectively referred to as a GNSS system 17 in some cases.

The boom 4, the arm 5, and the bucket 6 each of which is a constituent element of the front work implement 1 has an inertial measurement unit 14, 15, or 16 installed at an appropriate position thereon for measurement of the posture (posture angle) of the corresponding constituent element. The inertial measurement units 14 to 16 are included in a front-implement posture angle acquiring apparatus that acquires posture angles of the front work implement 1 in the present invention.

In the following, in order to make distinctions between the inertial measurement units 13, 14, 15, and 16, they are referred to as a machine-body IMU 13, a boom IMU 14, an arm IMU 15, and a bucket IMU 16 as appropriate, according to their installation locations. In the present invention, the machine-body IMU 13 is included in at least one machine-body inclination sensor attached to the upper swing structure 2, and the boom IMU 14 is included in at least one front-implement inclination sensor attached to the front work implement 1.

Figure 2:
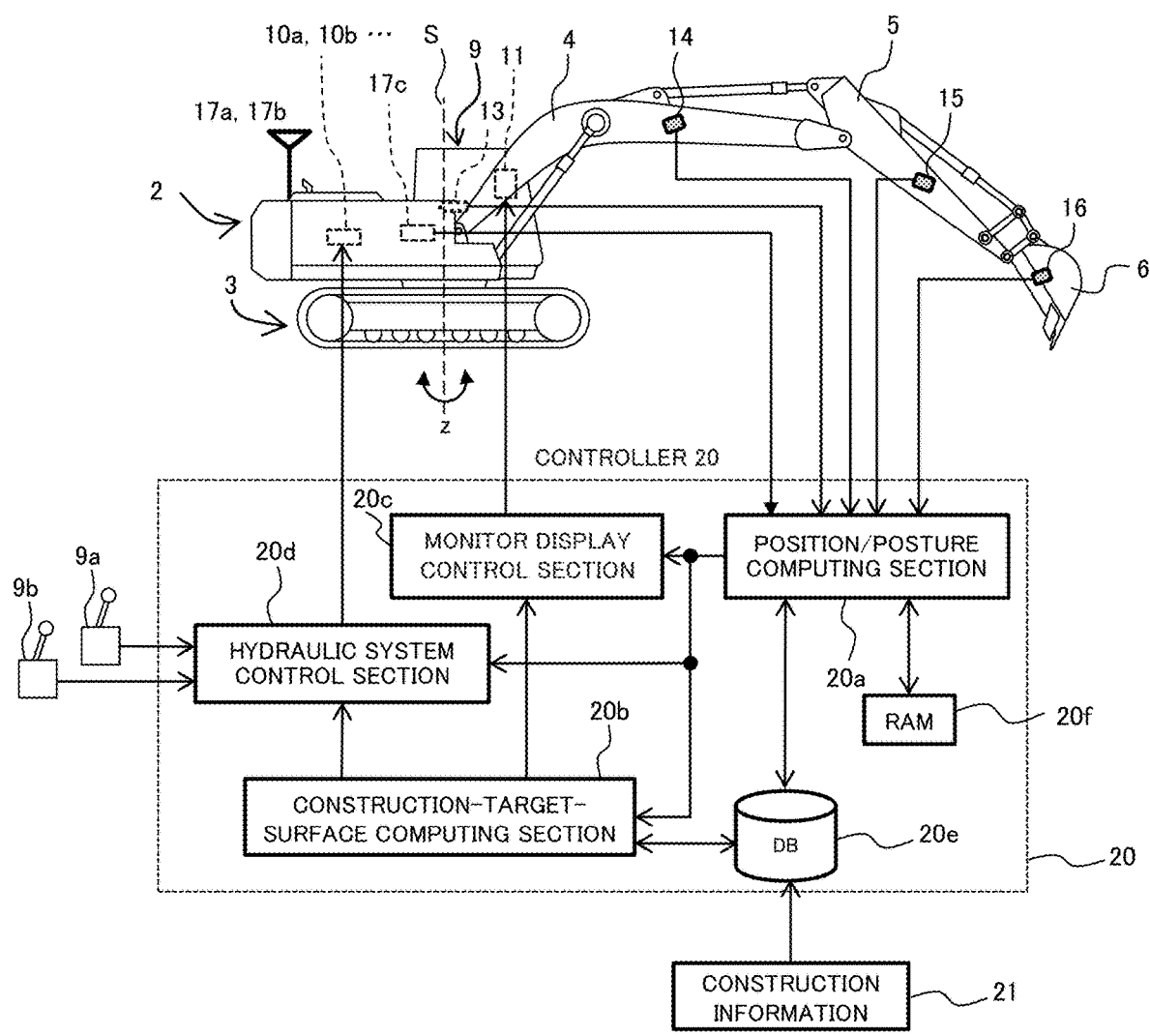
FIG. 2 is a block diagram depicting some of processing functionalities of a controller mounted on the hydraulic excavator in a first embodiment of the present invention.

FIG. 2 is a block diagram depicting some of processing functionalities of the controller 20 mounted on the hydraulic excavator 100 in a first embodiment of the present invention.

In FIG. 2, the controller 20 has various functionalities for controlling operation of the hydraulic excavator 100, and, as some of them, has functionalities of a position/posture computing section 20a, a construction target surface computing section 20b, a monitor display control section 20c, and a hydraulic system control section 20d. The position/posture computing section 20a, the construction target surface computing section 20b, the monitor display control section 20c, and the hydraulic system control section 20d are included in a CPU.

In addition, the controller 20 has a storage apparatus 20e as a database, a storage apparatus (e.g. RAM) 20f that stores values in the middle of computations, and a storage apparatus (e.g. ROM) that is not depicted and stores programs, setting values, and the like.

The position/posture computing section 20a receives, as input, sensing results from the inertial measurement units 13 to 16 (an angular velocity and posture angle (pitch angle) of the upper swing structure 2, and a posture angle of the front work implement 1), a computation result from the GNSS receiver 17c (three-dimensional coordinates of the GNSS antennas 17a and 17b, and an azimuth of the upper swing structure 2), and, on the basis of these input values, performs a position/posture computation process of computing a three-dimensional position and posture of the front work implement 1 in the machine-body coordinate system Σm set for the upper swing structure 2, for example.

The construction target surface computing section 20b computes a construction target surface defining a target shape of a construction subject on the basis of construction information 21 such as a three-dimensional working drawing prestored on the storage apparatus 20e by a construction manager, and a three-dimensional position and posture of the front work implement 1 computed at the position/posture computing section 20a.

The monitor display control section 20c controls display of the monitor 11 provided in the cabin 9, computes an instruction content for operation assistance for an operator on the basis of the construction target surface computed at the construction target surface computing section 20b, and the position and posture of the front work implement 1 computed at the position/posture computing section 20a, and causes the instruction content to be displayed on the monitor 11 in the cabin 9. That is, the monitor display control section 20c is responsible for some of functionalities as a machine guidance system that assists operation performed by the operator by causing the posture of the front work implement 1 having driven members such as the boom 4, the arm 5, or the bucket 6, or the tip position and angle of the bucket 6 to be displayed on the monitor 11, for example.

The hydraulic system control section 20d controls a hydraulic system of the hydraulic excavator 100 including the hydraulic pump apparatus 7, the control valve 8, the solenoid proportional valves 10a, 10b . . . , the hydraulic actuators 2a to 6a and the like, computes target operation velocities of the driven members of the front work implement 1 on the basis of operation signals (electric signals) output from the operation lever devices 9a and 9b, and controls the hydraulic system of the hydraulic excavator 100 such that the target operation velocities are realized. In addition, the hydraulic system control section 20d computes target operation velocities of the driven members of the front work implement 1 on the basis of the construction target surface computed at the construction target surface computing section 20b, and the position and posture of the front work implement 1 computed at the position/posture computing section 20a, corrects the corresponding operation signals output from the operation lever devices 9a and 9b such that the target operation velocities are realized, and controls the hydraulic system of the hydraulic excavator 100. Thereby, the hydraulic system control section 20d is responsible for some of functionalities as a machine control system that restricts operation such that the tip of a work device such as the bucket 6 does not get too close to enter an area within a certain distance from the target construction surface, and performs control such that a work device (e.g. the claw tip of the bucket 6) moves along the target construction surface.

In this manner, the controller 20 computes a position and posture of the front work implement 1 on the basis of the three-dimensional coordinates of the GNSS antennas 17a and 17b and the azimuth of the upper swing structure 2 calculated at the GNSS receiver 17c, the posture angle of the upper swing structure 2 acquired at the machine-body IMU 13 (machine-body posture angle acquiring apparatus), the angular velocity of the upper swing structure 2 acquired at the machine-body IMU 13 (angular velocity acquiring apparatus), and the posture angles of the front work implement 1 acquired at the boom IMU 14, the arm IMU 15 and the bucket IMU 16 (front-implement posture angle acquiring apparatus), and controls operation of the front work implement 1 on the basis of the position and posture of the front work implement 1.

In addition, as features of the present invention, the controller 20 performs the following computation processes at the position/posture computing section 20a.

First, in the controller 20, the position/posture computing section 20a determines the quality of the azimuth of the upper swing structure 2 calculated at the GNSS receiver 17c on the basis of at least one of the posture angle of the upper swing structure 2 acquired at the machine-body IMU 13 (machine-body posture angle acquiring apparatus) and the posture angle of the front work implement 1 acquired at the boom IMU 14 (front-implement posture angle acquiring apparatus), executes a bias removal computation of removing a gyro bias from the angular velocity of the upper swing structure 2 acquired at the machine-body IMU 13 (angular velocity acquiring apparatus) on the basis of a result of the determination about the quality of the azimuth, and the azimuth of the upper swing structure 2 calculated at the GNSS receiver 17c, determines presence or absence of swing operation of the upper swing structure 2 on the basis of the angular velocity of the upper swing structure 2 from which the gyro bias has been removed, calculates a corrected azimuth of the upper swing structure 2 on the basis of the azimuth of the upper swing structure 2 calculated at the GNSS receiver 17c, the angular velocity of the upper swing structure 2 from which the gyro bias has been removed, and a result of the determination about swing operation of the upper swing structure 2, and computes a position and posture of the front work implement 1 by using the corrected azimuth.

In addition, the controller 20 determines the quality of the azimuth of the upper swing structure 2 calculated at the GNSS receiver 17c on the basis of at least one of the posture angle of the upper swing structure 2 sensed at the machine-body IMU 13 (machine-body inclination sensor) and the posture angle of the front work implement 1 sensed at the boom IMU 14 (front-implement inclination sensor), and executes the bias removal computation when it is determined that the quality of the azimuth of the upper swing structure 2 is deteriorated. Note that in the present specification, that "the quality of the azimuth of the upper swing structure 2 is deteriorated" means that when the position/posture computing section 20a (a three-dimensional position/posture computing section 20a-2 mentioned below) computes a three-dimensional position and posture of the front work implement 1 by using the azimuth of the upper swing structure 2 calculated at the GNSS receiver 17c, the quality of the azimuth of the upper swing structure 2 is deteriorated to such an extent that the precision of the computation cannot secure appropriate operation control of the front work implement 1 by the hydraulic system control section 20d. In addition, in the following explanation, that "the quality of the azimuth of the upper swing structure 2 is deteriorated" is expressed also by the phrases that "the azimuth of the upper swing structure 2 is of low quality," "the quality of the azimuth of the upper swing structure 2 is bad," and so on, and the contrary situation is expressed also by the phrases that "the azimuth of the upper swing structure 2 is of high quality," "the quality of the azimuth of the upper swing structure 2 is good," and so on.

In addition, in the controller 20, the position/posture computing section 20a includes the storage apparatus 20f (azimuth storage apparatus) that stores an azimuth of the upper swing structure 2 that has been determined as being of high quality, and the position/posture computing section 20a computes a position and posture of the front work implement 1 by using, as a corrected azimuth, an azimuth that is stored on the storage apparatus 20f (azimuth storage apparatus) immediately before it is determined that an azimuth of the upper swing structure 2 is of low quality when it is determined that the azimuth of the upper swing structure 2 is of low quality and it is determined that there is no swing operation of the upper swing structure 2.

Furthermore, in the controller 20, the position/posture computing section 20a notifies a user that there is a possibility that the precision of the azimuth of the upper swing structure 2 is low when predetermined time period has elapsed while the quality of the azimuth of the upper swing structure 2 remains low after it is determined that the azimuth of the upper swing structure 2 is of low quality and it is determined that there is swing operation of the upper swing structure 2.

Figure 3:
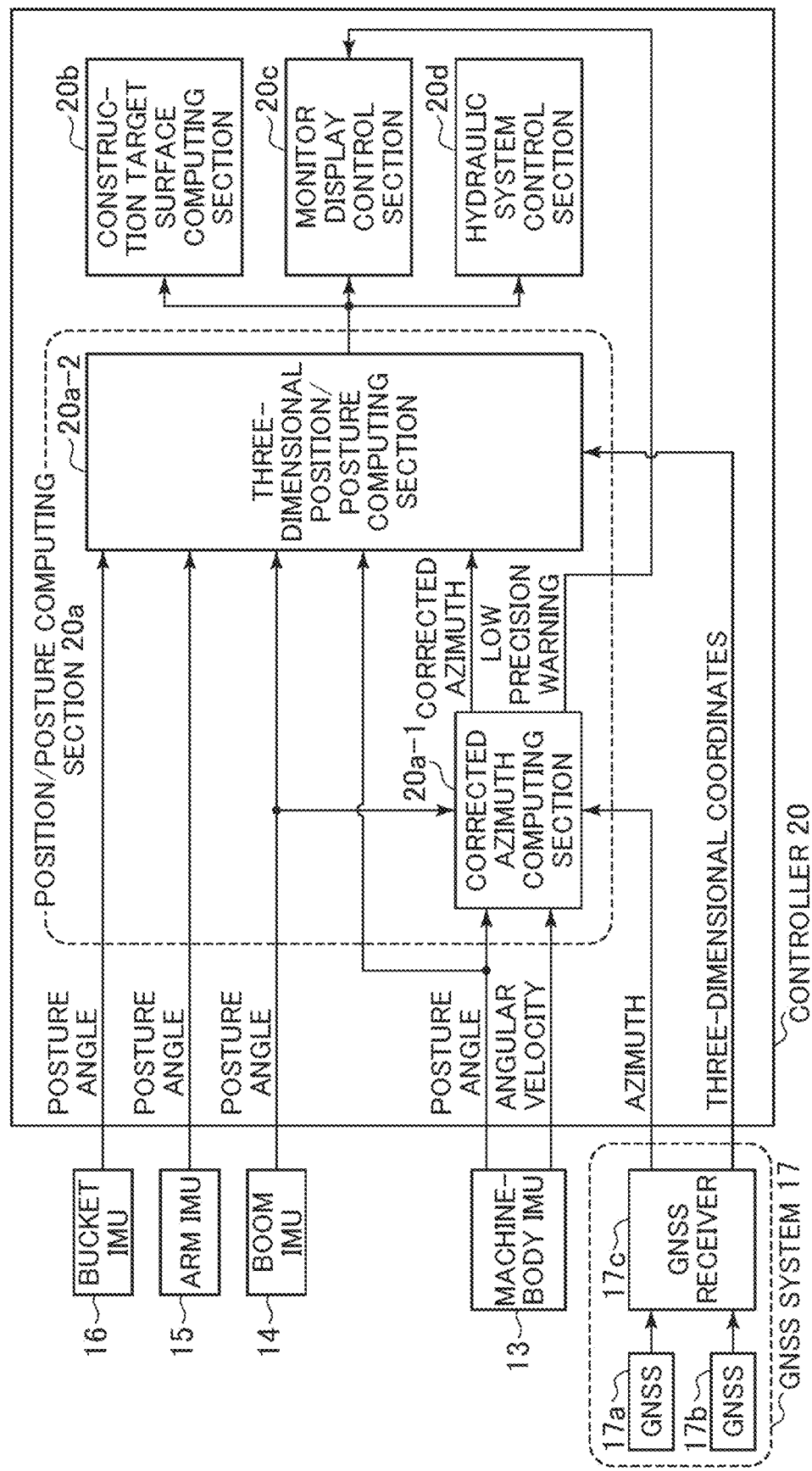
FIG. 3 is a block diagram depicting processing functionalities of a position/posture computing section of the controller which is a feature portion of the first embodiment.

In the following, details of the processing contents of the position/posture computing section 20a mentioned above are explained specifically according to FIG. 3. FIG. 3 is a block diagram depicting processing functionalities of the position/posture computing section 20a of the controller 20 which is a feature portion of the present embodiment.

In FIG. 3, the position/posture computing section 20a has a corrected-azimuth computing section 20a-1 and the three-dimensional position/posture computing section 20a-2.

The corrected-azimuth computing section 20a-1 receives, as input, values (signals) obtained through measurement and computation at the machine-body IMU 13, the boom IMU 14, and the GNSS system 17. More specifically, the azimuth of the upper swing structure 2 calculated at the GNSS receiver 17c, the angular velocity and posture angle of the upper swing structure 2 measured at the machine-body IMU 13, and the posture angle of the boom 4 calculated at the boom IMU 14 are input.

The corrected-azimuth computing section 20a-1 implements a correction computation mentioned below on the azimuth of the upper swing structure 2 calculated by the GNSS receiver 17c, and calculates a corrected azimuth. In addition, the corrected-azimuth computing section 20a-1 calculates a low precision warning flag for notifying an operator that the corrected azimuth cannot be computed with sufficient precision when such a state occurs. Then, the corrected-azimuth computing section 20a-1 gives a notification to the operator by presenting a message on the monitor 11 and so on via the monitor display control section 20c when the low-precision warning flag is enabled.

The three-dimensional position/posture computing section 20a-2 receives, as input, the posture angles sensed at the IMUs 13 to 16, the three-dimensional coordinates of the GNSS antennas 17a and 17b calculated at the GNSS receiver 17c, and the corrected azimuth calculated at the corrected-azimuth computing section 20a-1.

The three-dimensional position/posture computing section 20a-2 is configured to compute a position and posture of the hydraulic excavator 100, for example, in the machine-body coordinate system Σm on the basis of the three-dimensional coordinates of the GNSS antennas 17a and 17b acquired at the GNSS system 17.

The three-dimensional position/posture computing section 20a-2 computes a three-dimensional position and posture of the front work implement 1, for example, in the machine-body coordinate system Σm on the basis of the position and posture of the hydraulic excavator 100 in the machine-body coordinate system Σm, the posture angles sensed at the IMUs 13 to 16 and the corrected azimuth calculated at the corrected-azimuth computing section 20a-1, and, as mentioned before, this computation value is sent to the construction target surface computing section 20b, the monitor display control section 20c, and the hydraulic system control section 20d.

The three-dimensional position/posture computing section 20a-2 may calculate the three-dimensional position and posture of the front work implement 1 in a site coordinate system set around the hydraulic excavator 100 instead of the machine-body coordinate system Σm, or a calculated three-dimensional position and posture of the front work implement 1 in the machine-body coordinate system Σm may be used for control after being converted into a three-dimensional position and posture in the site coordinate system.

The GNSS system 17 in the present embodiment acquires an azimuth of the upper swing structure 2 by implementing RTK positioning between the two GNSS antennas 17a and 17b as mentioned before. Because of this, postural changes in the hydraulic excavator 100 influence the quality of an azimuth (mentioned below).

On the other hand, regarding positional information of three-dimensional coordinates, RTK positioning that uses correction information transmitted from the base station through wireless communication connection with the base station installed at the construction site or correction information distributed through a network is implemented. Because of this, the influence of postural changes in the hydraulic excavator 100 on the three-dimensional position information is very small as compared to that on an azimuth. In addition, the three-dimensional coordinates used at the three-dimensional posture computing section 20a-2 may have their origin at the GNSS antenna 17a or 17b having a lower DOP ((Dilution of Precision) deterioration rate in the two GNSS antennas 17a and 17b, in FIG. 15B and FIG. 15C mentioned below. That is, in a state in which a part of the zenith direction is hidden as depicted in FIG. 15B and FIG. 15C, a GNSS antenna on a side where satellites are not arranged at a particular location in an unbalanced manner may be used for a position computation. Accordingly, even in a case where the quality of the azimuth acquired by the GNSS system 17 has been deteriorated due to postural changes in the hydraulic excavator 100, the precision of the positional information of the three-dimensional coordinates acquired in the RTK positioning by the GNSS system 17 is less deteriorated, and the three-dimensional positional information can be used at the three-dimensional position/posture computing section 20a-2.

On the basis of such a way of thinking, in the present invention, the three-dimensional posture computing section 20a-2 computes a three-dimensional position and posture of the front work implement 1 by using the corrected azimuth calculated at the corrected-azimuth computing section 20a-1 as the azimuth of the upper swing structure 2 of the hydraulic excavator 100, and using the three-dimensional coordinates of the GNSS antennas 17a or 17b whose positioning precision is less deteriorated. Since other computations in the three-dimensional posture computing section 20a-2 are not particularly different from those in conventional technologies, detailed explanations thereof are omitted.

Figure 4:
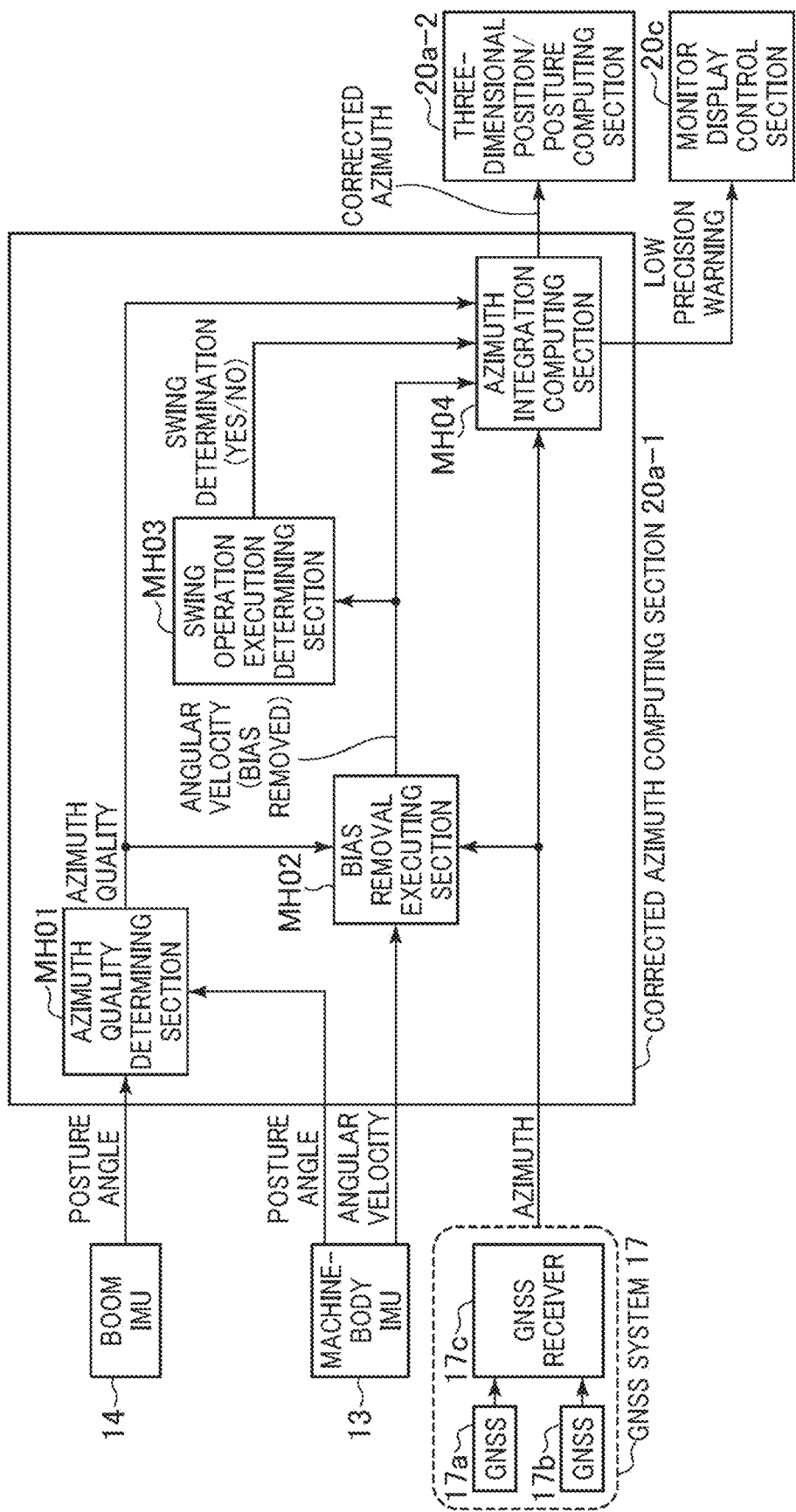
FIG. 4 is a block diagram depicting processing functionalities of a corrected-azimuth computing section.

In the following, the corrected-azimuth computing section 20a-1 as a feature of the present invention is explained in detail by using FIG. 4. FIG. 4 is a block diagram depicting processing functionalities of the corrected-azimuth computing section 20a-1.

In FIG. 4, the corrected-azimuth computing section 20a-1 has four computation functionalities including an azimuth quality determining section MH01, a bias removal executing section MH02, a swing operation determining section MH03, and an azimuth integration computing section MH04.

<Azimuth Quality Determining Section MH01>

The azimuth quality determining section MH01 determines the quality of the azimuth of the upper swing structure 2 calculated by the GNSS system 17 by using postural information of the hydraulic excavator 100. In the present embodiment, as the postural information of the hydraulic excavator 100, the posture angle information acquired at the machine-body IMU 13 and the boom IMU 14 is used.

Here, first, the necessity of determining the quality of the azimuth of the upper swing structure 2 calculated by the GNSS system 17 is explained.

Since the front work implement 1 of the hydraulic excavator 100 includes a metallic member, it is possible that GNSS satellite signals are reflected or interrupted by the front work implement 1.

In addition, since the front work implement 1 repeats vertical operation in excavation operation of the hydraulic excavator 100, the hydraulic excavator 100 is located in an environment where reflection or stoppage of satellite signals occurs repeatedly.

Problems that occur in a case in which GNSS positioning is performed by using the GNSS antennas 17a and 17b in such a use environment are explained by using FIG. 13 to FIG. 16.

Figure 13:
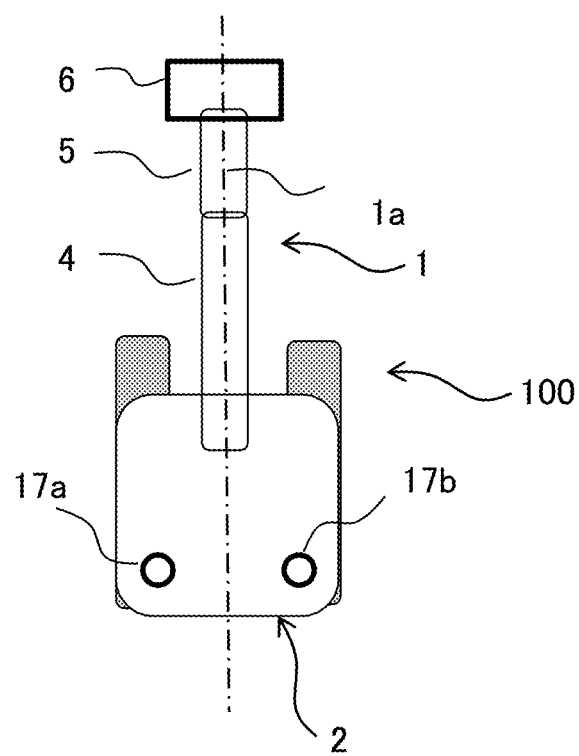
FIG. 13 is a top view of the hydraulic excavator.
Figure 14A:
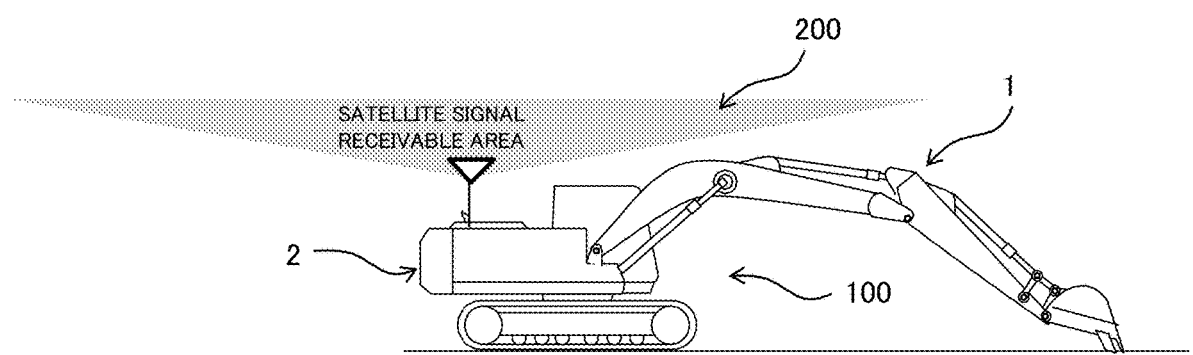
FIG. 14A is a figure depicting a satellite signal reception situation in a state where a front work implement of the hydraulic excavator is lowered.
Figure 14B:
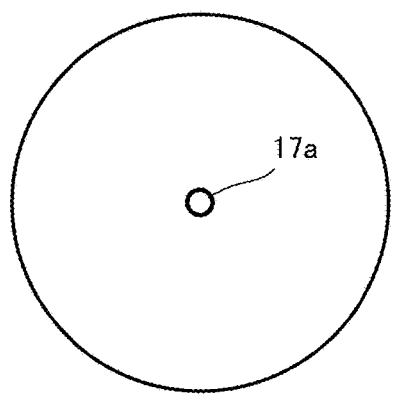
FIG. 14B is a figure depicting a satellite signal reception situation in a state where the front work implement of the hydraulic excavator is lowered.
Figure 14C:
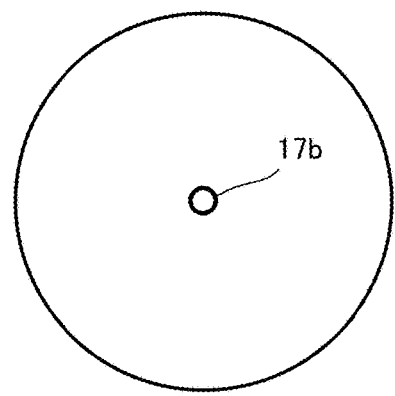
FIG. 14C is a figure depicting a satellite signal reception situation in a state where the front work implement of the hydraulic excavator is lowered.

FIG. 13 is a top view of the hydraulic excavator 100. FIG. 14A to FIG. 14C are figures depicting a satellite signal reception situation in a state where the front work implement 1 is lowered. FIG. 15A to FIG. 15D are figures depicting a satellite signal reception situation in a state where the front work implement 1 is raised. FIG. 16 is a figure depicting a satellite signal reception situation in a state where the hydraulic excavator 100 is arranged on a slope.

As depicted in FIG. 13, the GNSS antennas 17a and 17b are arranged to the left and right of a center line 1a of the front work implement 1.

As depicted in FIG. 14A, in a state where the boom 4 is in a lowered posture, and the front work implement 1 is lowered, the front work implement 1 is at a position lower than the GNSS antennas 17a and 17b, and thus the images of objects that interrupt a satellite signal receivable area 200 in the zenith direction from the GNSS antennas 17a and 17b are like the ones depicted in FIG. 14B and FIG. 14C. FIG. 14B corresponds to a top view of the GNSS antenna 17a arranged on the left side in FIG. 13, and FIG. 14C corresponds to a top view of the GNSS antenna 17b arranged on the right side in FIG. 13. As depicted in FIG. 14B and FIG. 14C, there are no interrupting objects at all in the air over the GNSS antennas 17a and 17b, and thus this is a situation where satellite signals are unlikely to be interrupted or reflected.

Figure 15A:
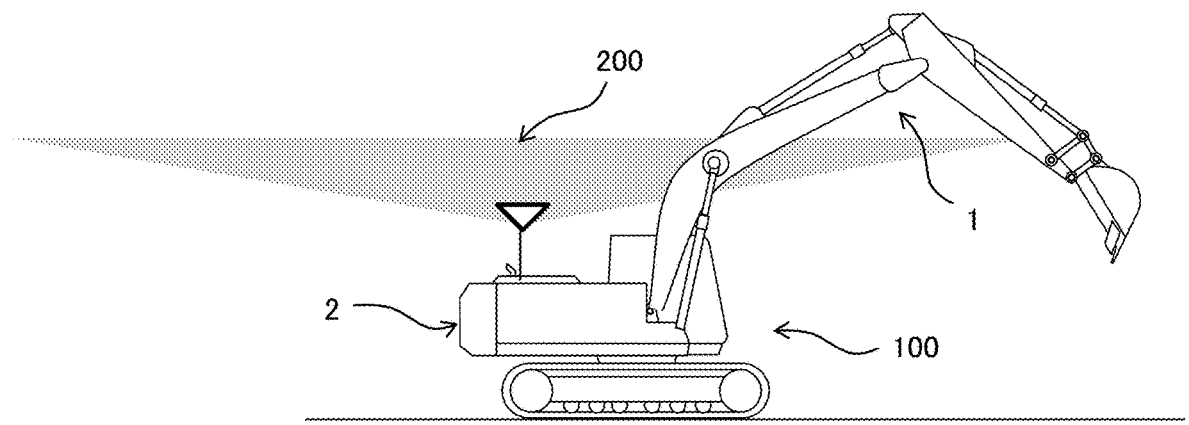
FIG. 15A is a figure depicting a satellite signal reception situation in a state where the front work implement of the hydraulic excavator is raised.
Figure 15B:
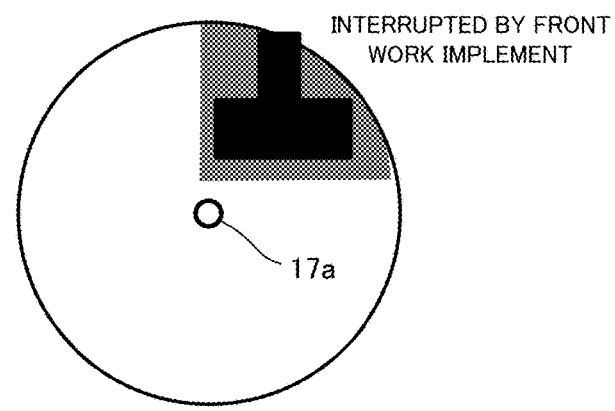
FIG. 15B is a figure depicting a satellite signal reception situation in a state where the front work implement of the hydraulic excavator is raised.
Figure 15C:
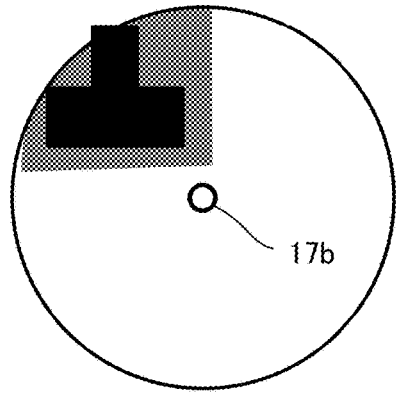
FIG. 15C is a figure depicting a satellite signal reception situation in a state where the front work implement of the hydraulic excavator is raised.
Figure 16:
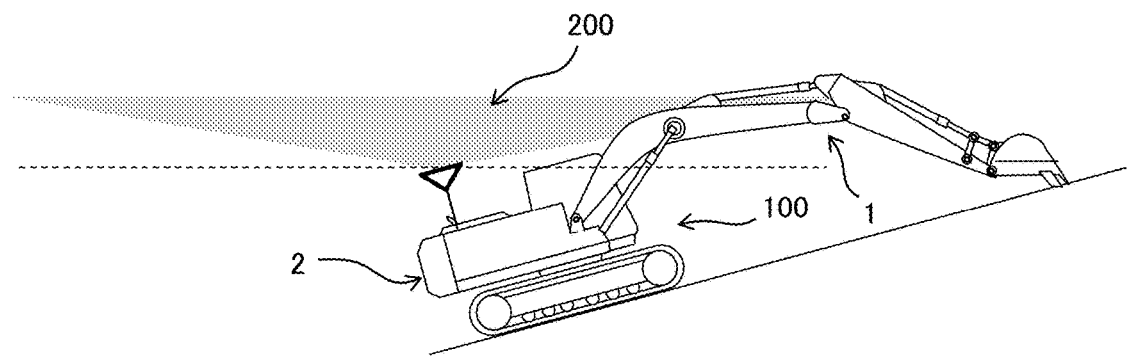
FIG. 16 is a figure depicting a satellite signal reception situation in a state where the hydraulic excavator is arranged on a slope.

On the other hand, in a state where the boom 4 is in a raised posture, and the front work implement 1 is raised as depicted in FIG. 15A, the front work implement 1 is at a position higher than the GNSS antennas 17a and 17b. In such a situation, the satellite signal receivable area 200 in the zenith direction from the GNSS antennas 17a and 17b is partially interrupted by the front work implement 1, and it becomes impossible for the GNSS antennas 17a and 17b to receive satellite signals from the direction where the front work implement 1 is present. Furthermore, since the GNSS antennas 17a and 17b are arranged to the left and right of the front work implement 1, it should be noted that areas to be interrupted have a symmetric relation as depicted in FIG. 15B and FIG. 15C. FIG. 15B corresponds to a top view of the GNSS antenna 17a arranged on the left side in FIG. 13, and FIG. 15C corresponds to a top view of the GNSS antenna 17b arranged on the right side in FIG. 13.

In addition, portions in FIGS. 15B and 15C that are painted black represent areas where the front work implement 1 interrupts satellite signals at a certain time, and portions that are painted gray schematically represent areas where the front work implement 1 interrupts satellite signals due to consecutive postural changes in the front work implement 1.

Figure 15D:
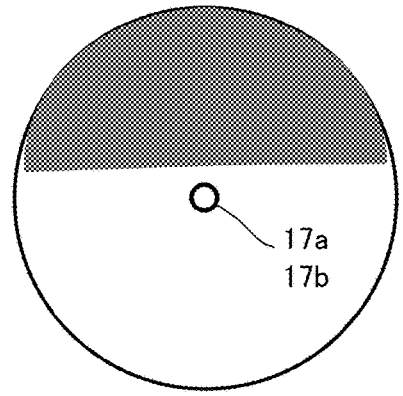
FIG. 15D is a figure depicting a satellite signal reception situation in a state where the front work implement of the hydraulic excavator is raised.

Now, as mentioned above, when an azimuth of the upper swing structure 2 is to be calculated by using the two GNSS antennas 17a and 17b, RTK positioning is implemented by using one of the GNSS antennas 17a and 17b as a main antenna and the other one as a sub antenna. At this time, since only common satellites that are available to the two GNSS antennas 17a and 17b are used for positioning, this situation is equivalent to a situation where satellite signals are interrupted in an area at which the interruption areas for the GNSS antennas 17a and 17b are combined as depicted in FIG. 15D. That is, there is a risk that simply raising the front work implement 1 undesirably makes it impossible for half of satellite signals transmitted from the zenith direction to be used for positioning. In such a situation, satellites whose satellite signals are available are arranged in a significantly unbalanced manner, and thus the precision of computation of an azimuth is deteriorated.

In addition, since the hydraulic excavator 100 performs raising and lowering of the front work implement 1 frequently, azimuths calculated by GNSS positioning undesirably vary even if the upper swing structure 2 remains unswung. If the calculation results are used for machine guidance, it undesirably appears that the upper swing structure 2 is operating unsteadily.

Furthermore, in a case in which the machine body (upper swing structure 2) of the hydraulic excavator 100 is inclined in the forward and backward direction such as a case in which the hydraulic excavator 100 is arranged on an inclined location as depicted in FIG. 16 also, a situation can occur where the zenith direction is interrupted even if the boom is in a lowered posture. In such a situation also, satellites whose satellite signals are available are arranged in an unbalanced manner, and thus the precision of computation of an azimuth is deteriorated.

Returning to FIG. 4, conditions for determining the azimuth quality in the azimuth quality determining section MH01 are explained.

When the boom 4 is in a lowered posture as depicted in FIG. 14A, there are no obstacles in the air over the GNSS antennas 17a and 17b, and thus it is determined that the quality of an azimuth of the upper swing structure 2 computed by the GNSS system 17 is good. On the other hand, when the boom 4 is in a raised posture as depicted in FIG. 15A, satellite signals from a particular direction are interrupted, and thus it is determined that the quality of an azimuth of the upper swing structure 2 computed by the GNSS system 17 is inferior. The azimuth quality determining section MH01 determines the azimuth quality on the basis of such a way of thinking. That is, a boom angle acquired at the boom IMU 14 is input as a posture angle of the front work implement 1, and it is determined that the quality of an azimuth of the upper swing structure 2 is good when the boom angle (posture angle) is equal to or larger than a predetermined value, and the quality of the azimuth is inferior when the boom angle is smaller than the predetermined value. Here, the predetermined value is 30 degrees relative to the horizontal plane, for example.

In addition, when the hydraulic excavator 100 is arranged on an inclined location as depicted in FIG. 16 also, it is determined that the quality of an azimuth computed by the GNSS system 17 is inferior as compared with the situation depicted in FIG. 14A. Accordingly, the azimuth quality determining section MH01 receives, as input and as a machine-body posture angle, a machine-body inclination angle acquired at the machine-body IMU 13 (a pitch angle which is an inclination in the forward and backward direction (around the y axis) of the upper swing structure 2), and determines that the quality of an azimuth of the upper swing structure 2 is good when the machine-body posture angle (pitch angle) is equal to or larger than a predetermined value, and the quality of the azimuth is inferior when the machine-body posture angle is smaller than the predetermined value, in this case also. Here, the predetermined value is 15 degrees relative to the horizontal plane, for example.

The predetermined values described above regarding boom angles and machine-body inclination angles are stored on a storage apparatus (e.g. a ROM) of the controller 20 as decision values for determining the quality of an azimuth of the upper swing structure 2.

Figure 5A:
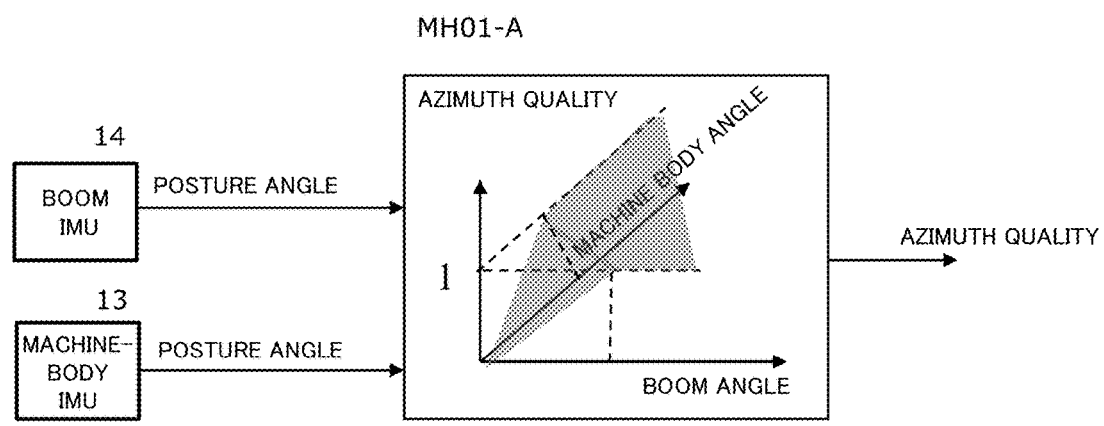
FIG. 5A is a figure depicting an example of a quality determination process of an azimuth quality determining section.

FIG. 5A is a figure depicting another example of a quality determination process at the azimuth quality determining section MH01.

The azimuth quality determining section MH01 may have an azimuth quality computing section MH01-A like the one depicted in FIG. 5A. The azimuth quality computing section MH01-A is configured as a three-dimensional table to which a boom angle and a machine-body inclination angle (a machine-body posture angle, that is, a pitch angle which is an inclination in the forward and backward direction (around the y axis) of the upper swing structure 2) are input, and from which the azimuth quality is output, on the basis of the determination conditions mentioned above. On this three-dimensional table, the azimuth quality is represented by numerical values from 0 to 1. The three-dimensional table is set such that as the azimuth quality lowers, the numerical value of the azimuth quality increases. That is, when the numerical value is 0, this means that the azimuth quality is the best, and when the numerical value is 1, this means that the azimuth quality is the worst.

The three-dimensional table of the azimuth quality computing section MH01-A has the following configuration.

First, the three-dimensional table is set such that even if, for example, the boom angle is the minimum (the boom is lowered), it outputs 1 as an azimuth quality if the machine-body inclination angle (pitch angle) is large. In addition, the three-dimensional table is set such that even if the machine-body inclination angle (pitch angle) is the minimum (when the machine body is kept horizontal), it outputs 1 as an azimuth quality if the boom angle is large (if the boom is raised). Furthermore, the three-dimensional table is set such that, for example, a value (B) as an azimuth quality calculated when the machine-body inclination angle (pitch angle) is 10 degrees and the boom angle is 10 degrees is larger than a value (A) as an azimuth quality calculated when the machine-body inclination angle (pitch angle) is 0 degrees and the boom angle is 10 degrees (A<B).

Figure 5B:
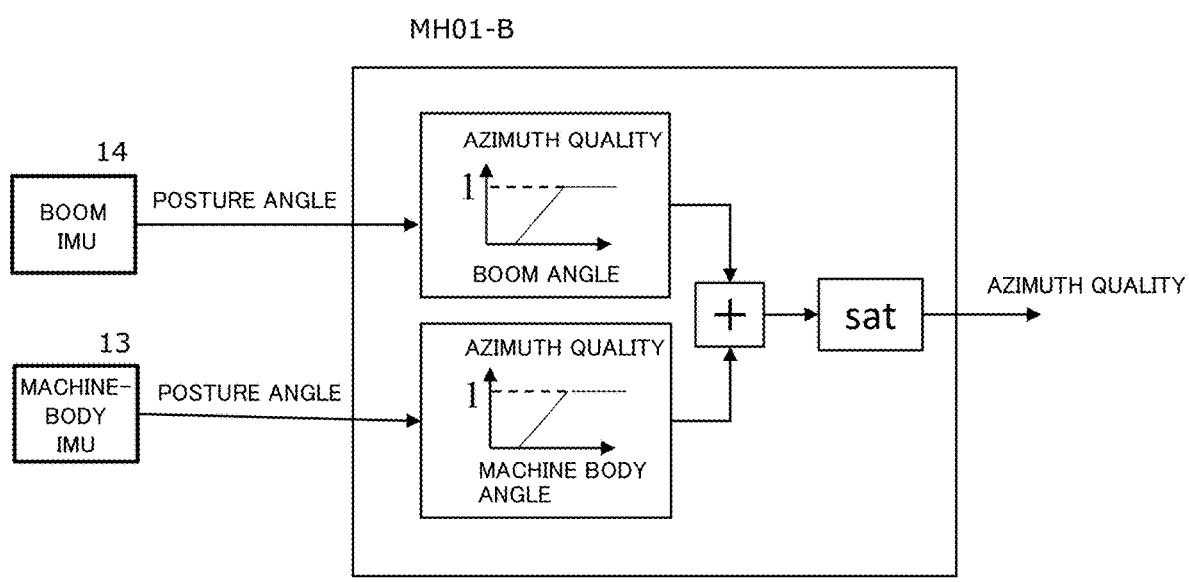
FIG. 5B is a figure depicting another example of a quality determination process of the azimuth quality determining section.

FIG. 5B is a figure depicting still another example of a quality determination process at the azimuth quality determining section MH01.

The azimuth quality determining section MH01 may have an azimuth quality computing section MH01-B like the one depicted in FIG. 5B. As depicted in FIG. 5B, the azimuth quality computing section MH01-B has a two-dimensional table T1 that outputs 1 as an azimuth quality when the boom angle is equal to or larger than a predetermined value, and a two-dimensional table T2 that outputs 1 as an azimuth quality when the machine-body inclination angle (pitch angle) is equal to or larger than a predetermined value. The azimuth quality computing section MH01-B calculates an azimuth quality by adding together the values of the azimuth quality calculated at the two two-dimensional tables T1 and T2, and making the sum saturated at 1.

The azimuth quality determining section MH01 uses the azimuth quality calculated at the azimuth quality computing section MH01-A or BMH01-B, and determines that the azimuth quality is good if the azimuth quality is equal to or larger than a predetermined value, for example 0.8, and the azimuth quality is inferior if the azimuth quality is smaller than the predetermined value.

<Bias Removal Executing Section MH02>

The bias removal executing section MH02 implements removal of a bias, a so-called gyro bias, of the angular velocity (the angular velocity in the swing direction (about the z axis)) sensed by the machine-body IMU 13.

For the removal of a gyro bias, a technique that applies a Kalman filter (KF: Kalman Filter) or an observer is used typically. In embodiments of the present invention, only a gyro bias removal method that uses a Kalman filter is explained. For details of Kalman filters, refer to "Adachi, Maruta: Fundamentals of Kalman Filter, Tokyo Denki University Press, 2012," for example.

Here, if the azimuth of the upper swing structure 2 is defined as θ, the actual angular velocity of the upper swing structure is defined as co, the angular velocity sensed by the machine-body IMU 13 is defined as $\omega^{mes}$, the gyro bias is defined as $\omega^b$, and the computation interval of the controller 20 is defined as Δt, the following Formulae (1) and (2) hold true.

[Equation 1]
$$\theta_k = \theta_{k-1} + \Delta t \omega_{k-1} \qquad \text{Formula (1)}$$

[Equation 2]
$$\omega_k = \omega_k^{mes} - \omega_k^b \qquad \text{Formula (2)}$$

Note that the subscripts k and k−1 are symbols representing times of computations. Regarding Formulae (1) and (2), a state vector xk is defined as in Formula (3).

[Equation 3]
$$x_k = \begin{bmatrix} \theta_k \\ \omega_k^b \end{bmatrix} \qquad \text{Formula (3)}$$

Furthermore, if the azimuth θ calculated by the GNSS receiver 17c is an observation value yk, the following Formulae (4) and (5) can be derived.

[Equation 4]
$$x_k = \begin{bmatrix} 1 & -\Delta t \\ 0 & 1 \end{bmatrix} x_{k-1} + \begin{bmatrix} \Delta t \\ 0 \end{bmatrix} \omega_{k-1}^{mes} \qquad \text{Formula (4)}$$

[Equation 5]
$$y_k = [1 \ 0] x_k \qquad \text{Formula (5)}$$

In order to apply a KF to Formulae (4) and (5), each matrix in Formulae (4) and (5) is expressed in a simplified form.

[Equation 6]
$$x_k = F_{k-1} x_{k-1} + G_{k-1} \omega_{k-1}^{mes} + w_{k-1} \qquad \text{Formula (a1)}$$

[Equation 7]
$$y_k = H_k x_k + v_k \qquad \text{Formula (a2)}$$

Here, newly added $w_{k-1}$ and $v_k$ are process noise and observation noise, respectively. Both the process noise and the observation noise are noise according to normal distributions whose average values are 0, the variance of $w_k$ is $Q_k$, and the variance of $v_k$ is $R_k$. Both $Q_k$ and $R_k$ are treated as design values.

If an estimated value of the state vector x is x̂ (^ is placed on x), and the covariance matrix of the state vector x is P, Prediction Formulae (a3) to (a6) of the Kalman filter, and Updating Formulae (a7) to (a9) can be given as the following formulae.

[Equation 8]
$$\hat{x}_{k|k-1} = F_{k-1} \hat{x}_{k-1|k-1} + G_{k-1} \omega_{k-1}^{mes} \qquad \text{Formula (a3)}$$

[Equation 9]
$$P_{k|k-1} = F_{k-1} P_{k-1|k-1} F_{k-1}^T Q_{k-1} \qquad \text{Formula (a4)}$$

[Equation 10]
$$p_{k|k-1}^{yy} = H_k P_{k|k-1} H_k^T + R_k \qquad \text{Formula (a5)}$$

[Equation 11]
$$p^{xy}_{k|k-1} = P_{k|k-1} H_k^T \quad \text{Formula (a6)}$$

[Equation 12]
$$K_k = P^{xy}_{k|k-1} (P^{yy}_{k|k-1})^{-1} \quad \text{Formula (a7)}$$

[Equation 13]
$$\hat{x}_{k|k} = \hat{x}_{k|k-1} + K_k(y_k - H_k \hat{x}_{k|k-1}) \quad \text{Formula (a8)}$$

[Equation 14]
$$P_{k|k} = P_{k|k-1} - K_k H_k P_{k|k-1} \quad \text{Formula (a9)}$$

According to the computations above, the state vector $\hat{x}$ ($\hat{}$ is placed on x) including the azimuth $\theta k$ and the gyro bias $\omega^b$ can be estimated sequentially.

It should be noted however that when the azimuth quality calculated at the azimuth quality determining section MH01 is low, azimuths, which correspond to the observation value $y_k$, vary relative to the true azimuth, and thus it is likely that errors occur in the estimated value of the gyro bias $\omega^b$. In order to solve this phenomenon, the logic is desirably constructed such that estimation of the gyro bias is enabled only when the azimuth quality is high.

For example, when a Kalman filter is used, the observation noise variance R is set to a very large value when the azimuth quality is low. If the observation noise variance R is set to a large value, Pxy in Formula (a5) assumes a large value. Therefore, the inverse matrix of Formula (a7) becomes close to 0, and thereby the Kalman gain also becomes close to 0.

When the Kalman gain K has become 0, updating Formulae (a8) and (a9) according to the Kalman filter can be simplified in the following manner.

[Equation 15]
$$\hat{x}_{k|k} = \hat{x}_{k|k-1} \quad \text{Formula (a10)}$$

[Equation 16]
$$P_{k|k} = P_{k|k-1} \quad \text{Formula (a11)}$$

Formulae (a10) and (a11) are nothing but formulae that output results of Prediction Formulae (a3) and (a4) as is. Furthermore, according to Formulae (3) and (4), Formula (a3) becomes

[Equation 17]
$$\hat{\omega}^b_{k|k} = \hat{\omega}^b_{k|k-1} \quad \text{Formula (a12)}$$

Accordingly, updating of the estimated value of the gyro bias is suspended.

As the angular velocity co from which the gyro bias has been removed, the bias removal executing section MH02 outputs a value obtained by subtracting the estimated value (the value of Formula (a12) described above) of the gyro bias $\omega^b$ calculated at the computations mentioned above from the angular velocity $\omega$mes calculated by the machine-body IMU 13.

<Swing Operation Determining Section MH03>

The swing operation execution determining section MH03 determines presence or absence of swing operation of the upper swing structure 2 by using the angular velocity co which is calculated at the bias removal executing section MH02 and from which the gyro bias has been removed. Specifically, when the absolute value of the angular velocity $\omega$ is equal to or larger than a predetermined value (e.g. 0.5 deg/s), it is determined that the upper swing structure 2 is swinging. It is needless to say that this predetermined value needs to be designed according to the capability of the machine-body IMU 13.

Note that a reason that the absolute value of the angular velocity $\omega$ is used is that because the upper swing structure 2 can be rotated counterclockwise (a positive angular velocity) and clockwise (a negative angular velocity) freely.

<Azimuth Integration Computing Section MH04>

The azimuth computation integration computing section MH04 performs a calculation of a corrected azimuth by using the computation results of the azimuth quality determining section MH01, the bias removal computation executing section MH02, and the swing operation execution determining section MH03, and the azimuth of the upper swing structure 2 output from the GNSS system 17. Specific processing contents are depicted below.

First, when the azimuth quality computed at the azimuth quality determining section MH01 is good, regardless of presence or absence of swing operation, which is determined by the swing operation execution determining section MH03, the azimuth $\theta$ of the upper swing structure 2 which is the calculated value from the GNSS receiver 17c is output as is, as a corrected azimuth $\theta$m. That is, $\theta$m=$\theta$.

It should be noted however that when the sampling interval of the GNSS receiver 17c is longer than the sampling interval of the machine-body IMU 13, an azimuth during each sampling interval may be calculated by interpolation by using the angular velocity $\omega$ calculated at the bias removal computation executing section MH02. For example, according to a computation interval $\Delta t$ of the controller 20, "$\Delta t \times \omega$" may be added sequentially to the azimuth $\theta$ output by the GNSS system 17.

In the following, computation contents of the azimuth integration computing section MH04 in a case in which the azimuth quality computed at the azimuth quality determining section MH01 is bad are explained.

First, the azimuth integration computing section MH04 outputs, as the corrected azimuth $\theta$m, an azimuth GO immediately before the azimuth quality is determined as being bad, when the swing operation execution determining section MH03 determines that there is no swing operation.

This uses the fact that as long as swing operation is not implemented, the azimuth does not change. Note that the controller 20 sequentially storing, on the storage apparatus 20f (see FIG. 2), the azimuth $\theta$ of the upper swing structure 2 which is a calculated value from the GNSS receiver 17c, and when the azimuth quality is determined as being bad, the controller 20 can output, as the corrected azimuth $\theta$m, the azimuth $\theta 0$ immediately before the azimuth quality is determined as being bad by reading out, as the azimuth GO, the azimuth $\theta$ stored on the storage apparatus 20f immediately before the determination.

Next, the azimuth integration computing section MH04 sets a reference value to the azimuth $\theta 0$ immediately before the azimuth quality is determined as being bad, and outputs, as the corrected azimuth $\theta$m, a value that is obtained by adding an integrated value of the output co of the gyro bias removal executing section MH02 to the azimuth $\theta 0$ when the swing operation execution determining section MH03 determines that there is swing operation, and time t that has elapsed from the determination of the azimuth quality being bad is shorter than predetermined value Tmax. That is, the corrected azimuth θm is given by the following formula.

[Equation 18]

$$\theta_m = \theta_o + \sum \Delta t\omega \qquad \text{Formula (6)}$$

Furthermore, the azimuth integration computing section MH04 enables a low-precision warning flag when the swing operation execution determining section MH03 determines that there is swing operation, and the time t that has elapsed from the determination of the azimuth quality being bad is equal to or longer than the predetermined value Tmax. This state means that a sufficiently precise azimuth cannot be calculated on the basis of an integrated value of the angular velocity calculated at the bias removal executing section MH02. Because of this, the calculation of the corrected azimuth θm is desirably suspended with the value of Formula (7). Note that the integer N is the number of samples within the predetermined time, and is "Tmax÷Δt."

[Equation 19]

$$\theta_m = \theta_o + \sum_{i=1}^{N} \Delta t\omega_i \qquad \text{Formula (7)}$$

Figure 6:
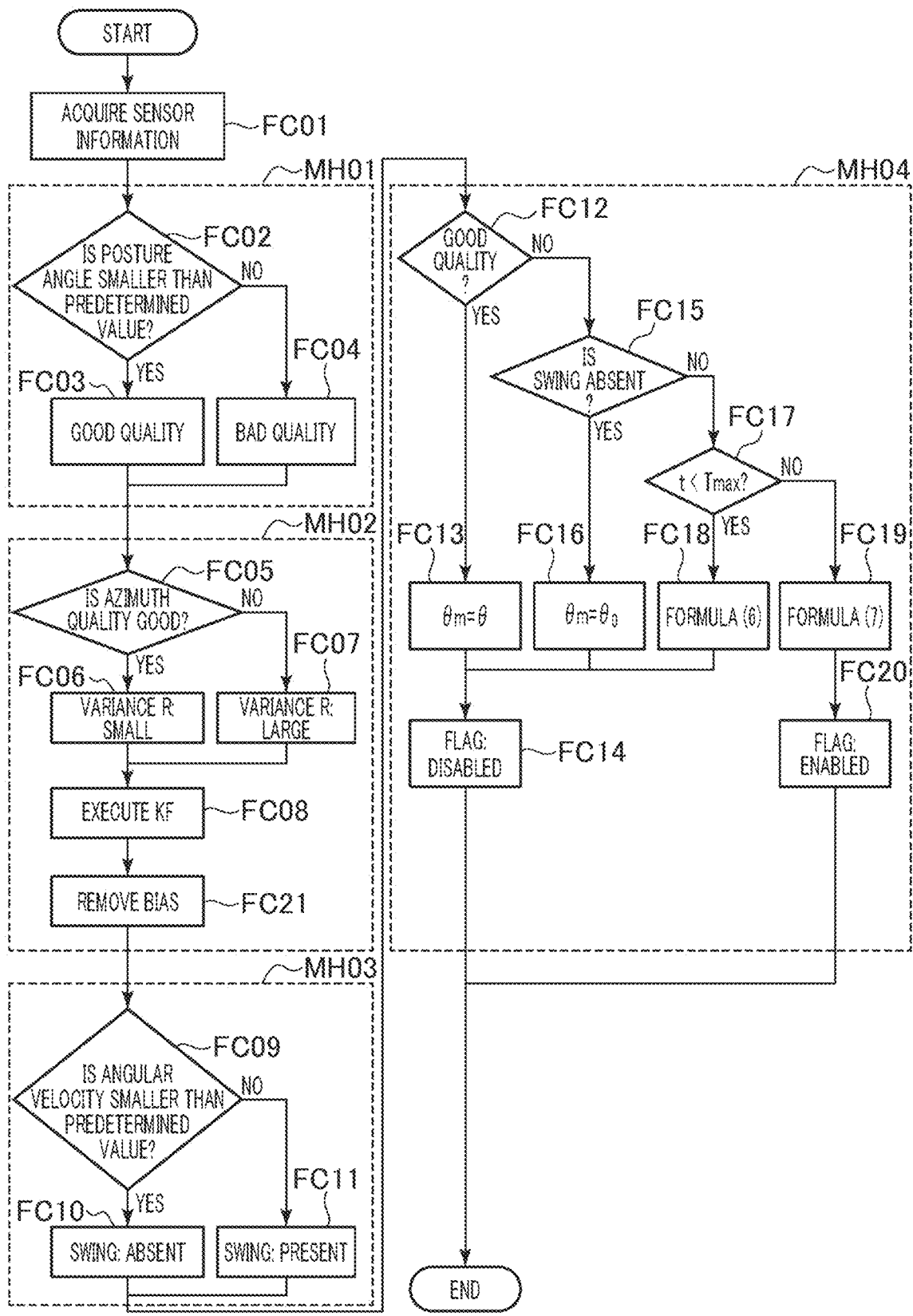
FIG. 6 is a flowchart depicting a computation procedure of the corrected-azimuth computing section.

The computation procedure of the corrected-azimuth computing section 20a-1 explained thus far is explained according to a flowchart in FIG. 6.

At Step FC01, information is acquired from various types of sensor (the IMUs 13 to 16, and the GNSS system 17) every time the computation interval of the controller 20 elapses.

At Step FC02, it is checked whether each posture angle acquired from the IMUs 13 to 16 is not a value that can deteriorate the azimuth quality. For example, when the boom angle is equal to or larger than a predetermined value (e.g. 30 degrees relative to the horizontal plane, etc.), the result of the decision is Yes, and the process proceeds to Step FC03. If the process proceeds to Step FC03, an indication that the azimuth quality is good is stored on the storage apparatus 20f (see FIG. 2). On the other hand, when the result of the decision is No, the process proceeds to Step FC04, and an indication that the azimuth quality is bad is stored on the storage apparatus 20f.

Note that Steps FC02 to FC04 are computation contents of the azimuth quality determining section MH01, and thus tables like the ones depicted in FIG. 5 may be referred to, bypassing determining sections.

At Step FC05, the azimuth quality stored on the storage apparatus 20f at Step FC03 or FC04 is referred to. A determination is made to proceed to Step FC06 when the value represents good quality (Yes), and to proceed to Step FC07 when the value represents bad quality (No).

In a case in which the process proceeds to Step FC06, the reliability of the azimuth acquired from the GNSS system 17 is high, and thus the observation noise variance R is set to a small value. On the other hand, in a case in which the process proceeds to Step FC07, the reliability of the azimuth acquired from the GNSS system 17 is low, and thus the observation noise variance R is set to a large value.

At Step FC08, a computation according to a Kalman filter (KF) that uses the variance R determined at Step FC06 or FC07 is performed, and the gyro bias is estimated.

After completion of the process at Step FC08, the process proceeds to Step FC21. At Step FC21, a gyro bias removal operation is implemented by subtracting the gyro bias $\omega^b$ estimated at Step FC08 from the angular velocity comes acquired by the machine-body IMU 13.

The series of computations at Steps FC05 to FC08 above is equivalent to the gyro bias removal executing section MH02.

At Step FC09, the angular velocity ω calculated at the gyro bias removal executing section MH02 and a predetermined value are compared with each other. If the absolute value of the angular velocity ω is smaller than the predetermined value (Yes), the process proceeds to Step FC10, and it is determined that swing operation is absent. On the other hand, if the absolute value of the angular velocity ω is equal to or larger than the predetermined value (No), the process proceeds to Step FC11, and it is determined that swing operation is present.

The series of computations at Steps FC09 to FC11 above is equivalent to the swing operation execution determining section MH03.

At Step FC12, again, the azimuth quality stored on the storage apparatus 20f is referred to. The process proceeds to Step FC13 when the azimuth quality is good (Yes), and proceeds to Step FC15 when the azimuth quality is bad (No).

In a case in which the process proceeds to Step FC13, this means that the azimuth quality is good, and thus the azimuth θ output by the GNSS system 17 is output as the corrected azimuth θm. Thereafter, the process proceeds to Step FC14, the low precision warning flag is disabled, and the computations are ended.

In a case in which the process proceeds to Step FC15, an indication of presence or absence of swing operation, which has been determined at Step FC10 or FC11, is referred to. The process proceeds to Step FC16 when swing operation is absent (in a case of Yes), and, on the other hand, the process proceeds to Step FC17 when swing operation is present (in a case of No).

In a case in which the process proceeds to Step FC16, although the azimuth quality is bad, swing operation is not being implemented, and thus the azimuth θ0 immediately before the azimuth quality becomes bad is output as the corrected azimuth θm. Thereafter, the process proceeds to Step FC14, the low precision warning flag is disabled, and the computations are ended.

In a case in which the process proceeds to Step FC17, it is checked whether the elapsed time t since the azimuth quality has become bad is shorter than the predetermined time period Tmax. When the elapsed time t is shorter than the predetermined time period (Yes), the process proceeds to Step FC18. On the other hand, when the elapsed time is equal to or longer than the predetermined value (No), the process proceeds to Step FC19.

In a case in which the process proceeds to Step FC18, the corrected azimuth θm is calculated according to Formula (6). Thereafter, the process proceeds to Step FC14, the low precision warning flag is disabled, and the computations are ended.

In a case in which the process proceeds to Step FC19, the corrected azimuth θm is calculated according to Formula (7). Thereafter, the process proceeds to Step FC20, the low precision warning flag is enabled, and the computations are ended.

In the manner mentioned above, in the present embodiment, in the controller 20, the position/posture computing section 20a determines that the azimuth of the upper swing structure 2 calculated at the GNSS receiver 17c is of low quality when at least one of the posture angle of the upper swing structure 2 acquired at the machine-body IMU 13 (machine-body posture angle acquiring apparatus) and the posture angle of the front work implement 1 acquired at the boom IMU 14 (front-implement posture angle acquiring apparatus) is equal to or larger than the predetermined value, executes a bias removal computation of removing a gyro bias from the angular velocity of the upper swing structure 2 acquired at the machine-body IMU 13 (angular velocity acquiring apparatus) on the basis of the quality of the azimuth, and the azimuth of the upper swing structure 2 calculated at the GNSS receiver 17c, determines presence or absence of swing operation of the upper swing structure 2 on the basis of the angular velocity of the upper swing structure 2 from which the gyro bias has been removed, and calculates a corrected azimuth of the upper swing structure 2 on the basis of the azimuth of the upper swing structure 2 calculated at the GNSS receiver 17c, the angular velocity of the upper swing structure 2 from which the gyro bias has been removed, and a result of the determination about swing operation of the upper swing structure 2. Accordingly, it is possible to calculate an accurate azimuth of the upper swing structure 2 by using a GNSS regardless of postural changes in the hydraulic excavator 100 such as raising and lowering of the front work implement 1, and acquire the azimuth of the upper swing structure 2 with high precision and robustness. Because of this, the frequency of suspending operation of machine guidance and machine control is decreased, and the work efficiency can be enhanced.

Second Embodiment

In the configuration in the first embodiment, only sensors that are additionally attached to the hydraulic excavator 100 are used.

A second embodiment of the present invention achieves easier or more robust computation contents by using sensors that are originally attached to the hydraulic excavator 100.

First, the following schematically explains features of the present embodiment.

In the present embodiment, the controller 20, when a determination is to be made about the quality of the azimuth of the upper swing structure 2 calculated at the GNSS receiver 17c, receives, as input, an operation signal of the operation lever device 9a (first operation lever device) that gives an instruction for raising operation (operation of the front work implement 1) of the boom 4 as a backup of the posture angle of the front work implement 1 acquired at the boom IMU 14 (front-implement posture angle acquiring apparatus), and determines, on the basis of the operation signal of the operation lever device 9a, that the azimuth of the upper swing structure 2 is of low quality when raising-direction operation of the front work implement 1 by the operation lever device 9a is continued for predetermined time period or longer. For example, the predetermined time period is the elapsed time from full operation of the operation lever device 9a in the boom raising direction when the front work implement 1 is in a typical posture at the start of boom raising until the angle of the boom 4 reaches the predetermined value mentioned before, and is stored on a storage apparatus (e.g. a ROM) of the controller 20 as a decision value for determining the quality of the azimuth of the upper swing structure 2.

In addition, the controller 20, when a determination is to be made about presence or absence of swing operation of the upper swing structure 2, receives, as input, an operation signal of the operation lever device 9b (second operation lever device) as a backup of the angular velocity of the upper swing structure 2 from which the gyro bias has been removed, and determines, on the basis of the operation signal of the operation lever device 9b, that there is swing operation of the upper swing structure 2 when the magnitude of the operation signal of the operation lever device 9b is equal to or larger than a predetermined value. The predetermined value is a value of an operation signal by which the swing motor 2a starts rotation when the operation signal is generated, and is stored on the storage apparatus (e.g. the ROM) of the controller 20 as a value for deciding presence or absence of swing operation of the upper swing structure 2.

Figure 7:
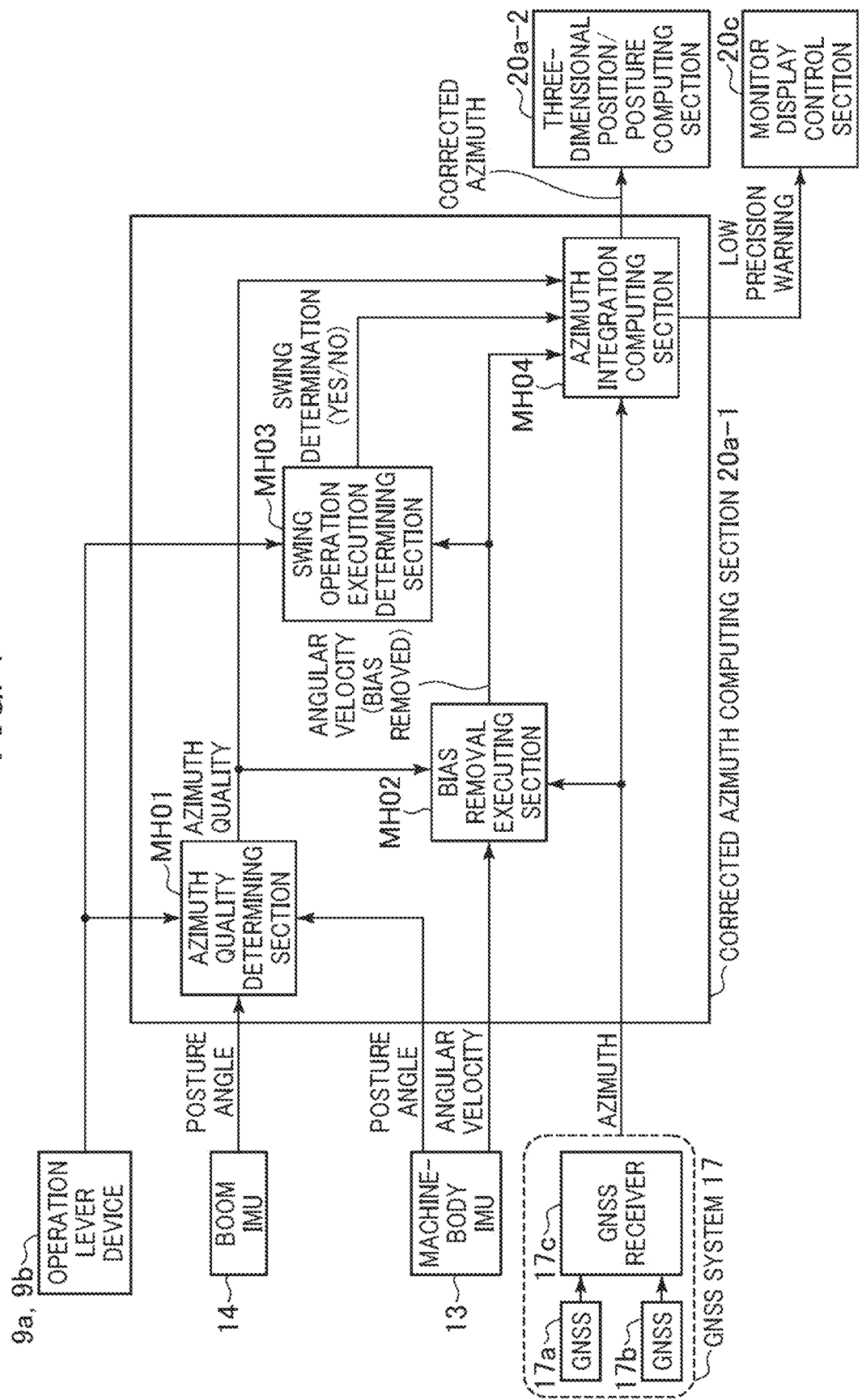
FIG. 7 is a block diagram depicting processing functionalities of the corrected-azimuth computing section in a second embodiment of the present invention.

In the following, details of the processing contents of the controller 20 mentioned above are explained on the basis of FIG. 7. FIG. 7 is a block diagram depicting processing functionalities of the corrected-azimuth computing section 20a-1 in the present embodiment.

In the corrected-azimuth computing section 20a-1 in the present embodiment, the azimuth quality determining section MH01 and the swing operation execution determining section MH03 that are depicted in FIG. 4 further receive, as input and as additional signals, operation signals (electric signals) of the operation lever devices 9a and 9b.

In addition to the determinations made by using the posture angle information output from the machine-body IMU 13 and the boom IMU 14 mentioned above, the azimuth quality determining section MH01 determines the azimuth quality also by using an operation signal for boom raising output from the operation lever device 9a. For example, if boom raising operation based on an operation signal for boom raising output from the operation lever device 9a continues for predetermined time period, the boom cylinder 4a extends gradually, and eventually the hydraulic excavator 100 is in the posture depicted in FIG. 15A. That is, even without acquiring the posture angle of the boom IMU 14, the posture of the front work implement 1 necessary for a determination about the azimuth quality can be estimated also by using an operation signal for boom raising, and the elapsed time from the start of output of the operation signal.

In this manner, by using an operation signal of the operation lever device 9a, even when a situation occurs where signals of the boom IMU 14 cannot be used due to a malfunction or the like by any chance, determinations about the azimuth quality can be continued, and enhancement of the robustness as the system can be realized.

Furthermore, in addition to the determination made by using the angular velocity ω output from the bias removal executing section MH02, the swing operation execution determining section MH03 in the present embodiment determines presence or absence of swing operation by using an operation signal for a swing output from the operation lever device 9b.

When a value of an operation signal related to swing operation is lower than a predetermined value (e.g. lower than 0.5 MPa in terms of a pilot pressure conversion value), a hydraulic fluid does not flow into the swing motor 2a, and thus the upper swing structure 2 is not rotated. However, if the value of the operation signal becomes equal to or larger than a predetermined value which is the lower limit value of an operation signal by which the swing motor 2a is rotated (e.g. equal to or larger than 1.0 MPa in terms of a pilot pressure conversion value), the hydraulic fluid flows into the swing motor 2a, and the upper swing structure 2 is rotated.

Because of this, by checking an operation signal related to swing operation, it becomes possible to determine presence or absence of swing operation before the machine-body IMU 13 senses changes in the angular velocity. The decision about swing operation made by using an operation signal of a swing in this manner is particularly effective when the capability to remove a gyro bias at the gyro bias removal executing section MH02 is insufficient, and the threshold value about the angular velocity for determining swing operation of Step FC09 in the flowchart in FIG. 6 cannot be lowered sufficiently.

Note that while in the first and second embodiments, only the posture angle of the boom IMU 14 is input to the azimuth quality determination computing section MH01, the present invention is not limited to this. When it is desired to more accurately determine the posture of the front work implement 1, a change may be made such that the posture angles of all of the boom IMU 14, the arm IMU 15, and the bucket IMU 16 are input.

In addition, while the operation lever devices 9a and 9b are electric levers in the case explained in the second embodiment, when the operation lever devices 9a and 9b are hydraulic pressure pilot lever devices, pressure sensors to sense pilot pressures according to the operation direction and operation amount of the individual operation levers may be provided, and signals of the pressure sensors may be input.

In this manner, according to the present embodiment, since operation signals of the operation lever devices 9a and 9b are used as backups of the posture angle of the front work implement 1 and the angular velocity of the upper swing structure 2, the robustness as the system can be enhanced further, and the work efficiency can be enhanced.

Third Embodiment

While inclination angle sensors represented by IMUs are used for the front work implement 1 in the first and second embodiments, the present invention can be implemented without using inclination angle sensors for the front work implement 1.

First, the following schematically explains features of the present embodiment.

In the present embodiment, the hydraulic excavator 100 includes an image recognizing apparatus 35 (see FIG. 8) as a posture angle acquiring apparatus of at least one of the machine-body IMU 13 (machine-body posture angle acquiring apparatus) and the boom IMU 14 (front-implement posture angle acquiring apparatus), the image recognizing apparatus 35 recognizes at least one of the posture angle of the upper swing structure 2 and the posture angle of the front work implement 1 on the basis of image information acquired from at least one camera 30, 32 or 33 (see FIG. 8), and the controller 20 determines the quality of the azimuth of the upper swing structure 2 calculated at the GNSS receiver 17c on the basis of the at least one of the posture angle of the upper swing structure 2 and the posture angle of the front work implement 1 recognized at the image recognizing apparatus 35, and executes the bias removal computation when it is determined that the azimuth of the upper swing structure 2 is of low quality.

Hereinafter, details of the third embodiment are explained by using FIG. 8 to FIG. 10.

Figure 8:
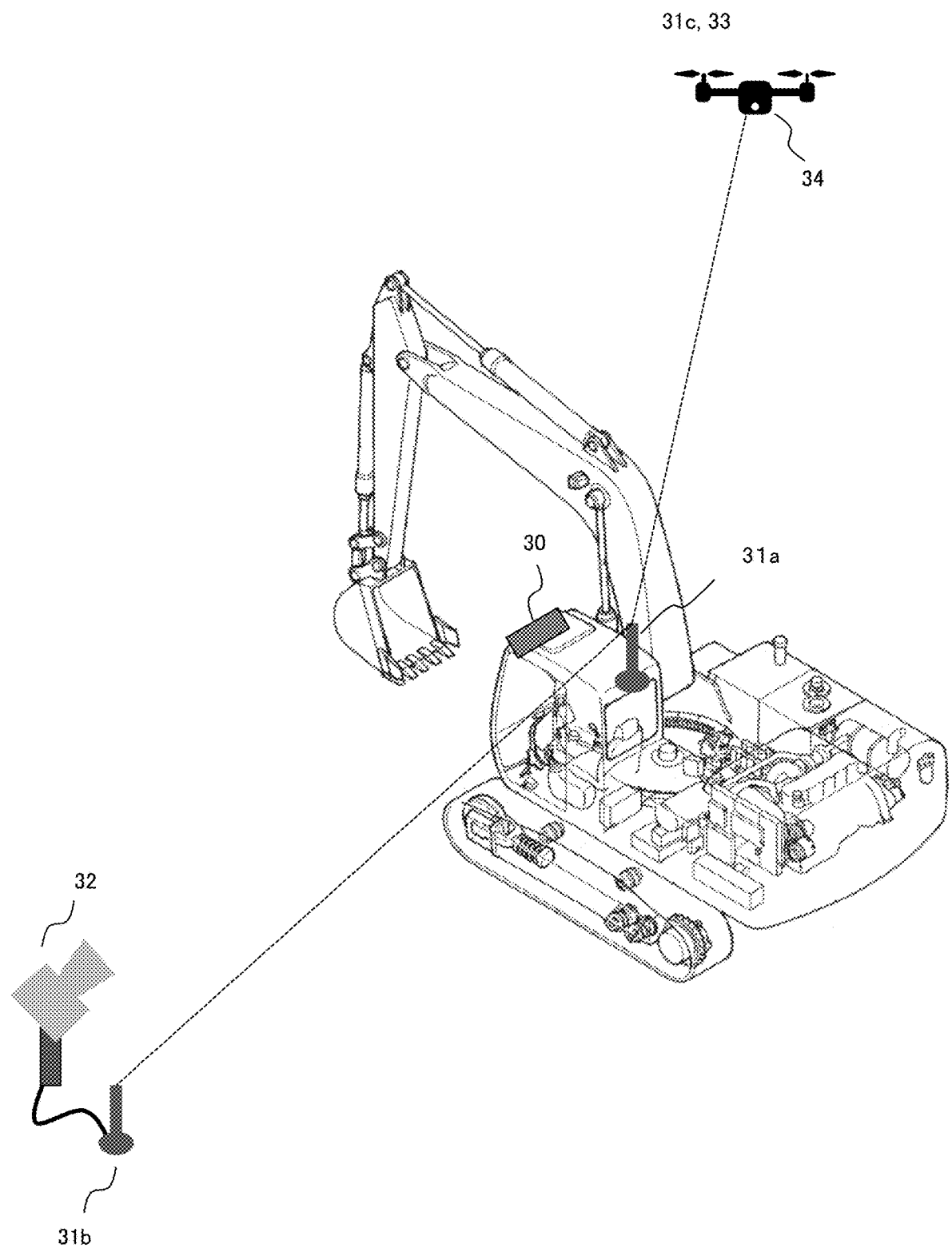
FIG. 8 is a figure depicting the external appearance of the hydraulic excavator in a third embodiment of the present invention, and a situation around the hydraulic excavator.

FIG. 8 is a figure depicting the external appearance of the hydraulic excavator 100 in the present embodiment, and a situation around the hydraulic excavator 100. Note that for simplification of explanation, reference characters representing constituent elements identical to their counterparts in FIG. 1 are not depicted in the figure.

The hydraulic excavator 100 related to the present embodiment includes a stereo camera 30 installed on the front side of the top of the cabin 9, and a wireless communication machine 31a installed on the rear side of the top of the cabin 9. The wireless communication machine 31a performs wireless communication with another wireless communication machine 31b provided in the work site. The wireless communication machine 31b distributes, in the work site, information about images captured by a management camera 32 provided in the work site. Note that the management camera 32 is not limited to a camera fixed in the work site. For example, a camera 33 and a wireless communication machine 31c may be mounted on an unmanned aerial vehicle (drone) 34 that can freely fly in the work site.

Figure 9:
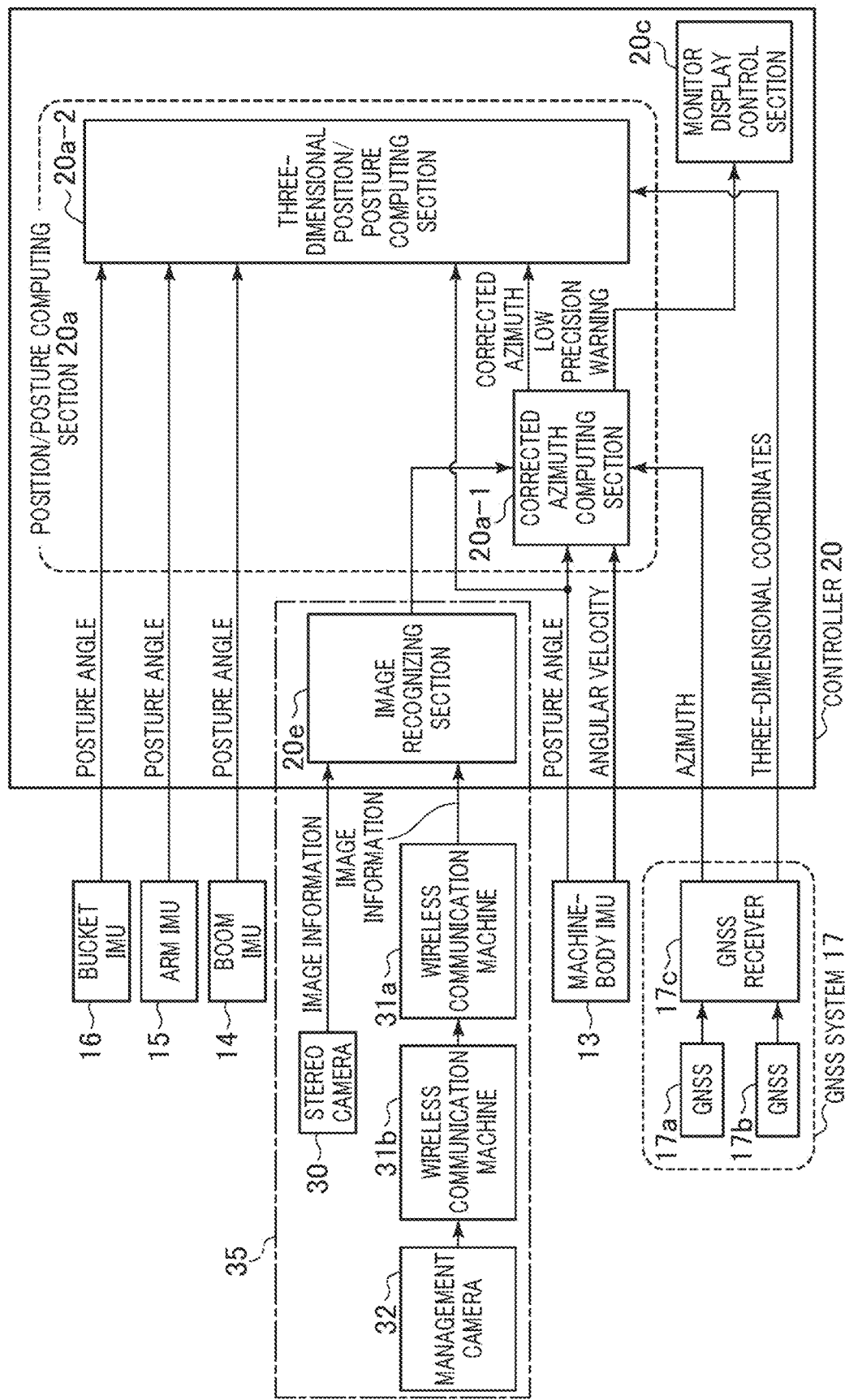
FIG. 9 is a block diagram depicting processing functionalities of the controller in the third embodiment.

FIG. 9 is a block diagram depicting processing functionalities of the controller 20 in the present embodiment. Note that for simplification of explanation, the construction target surface computing section 20b and the hydraulic system control section 20d depicted in FIG. 3 are not depicted in the figure.

Processing functionalities of the controller 20 in the present embodiment are the same as processing functionalities of the controller 20 in the first embodiment depicted in FIG. 3 in other respects than that a change is made such that information of the stereo camera 30 and the wireless communication machine 31b installed at the hydraulic excavator depicted in FIG. 8 is input. The controller 20 additionally has an image recognizing section 20g that calculates postural information of the front work implement on the basis of the acquired image information, as a changed portion in the functionality. An apparatus obtained by integrating the stereo camera 30, the management camera 32, and the image recognizing section 20g is equivalent to the image recognizing apparatus 35 mentioned before.

Postural information calculated by the image recognizing section 20g of the image recognizing apparatus 35 significantly depends on the capabilities (resolution, etc.) of the stereo camera 30 and the management camera 32. It is sufficient, in the present invention, that capabilities that make it possible to determine whether the front work implement 1 is in a raised posture (FIG. 15A) or a lowered posture (FIG. 14A) are provided.

In the present embodiment, the postural information computed at the image recognizing section 20g mentioned above is used at the corrected-azimuth computing section 20a-1.

Figure 10:
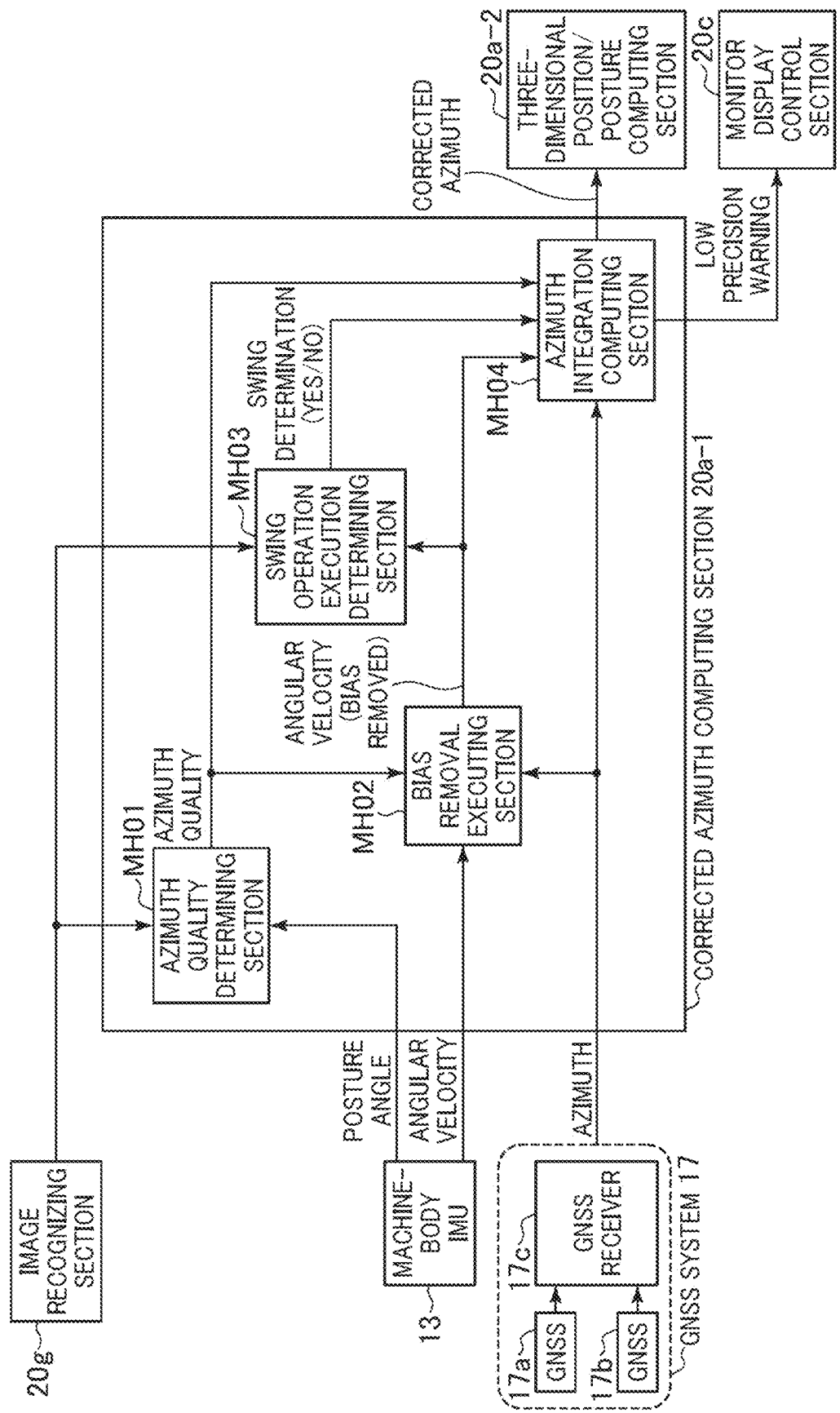
FIG. 10 is a block diagram depicting processing functionalities of the corrected-azimuth computing section in the third embodiment.

FIG. 10 is a block diagram depicting processing functionalities of the corrected-azimuth computing section 20a-1 in the present embodiment.

In FIG. 10, in the corrected-azimuth computing section 20a-1, the azimuth quality determining section MH01 and the swing operation execution determining section MH03 that are depicted in FIG. 4 further receive, as input and as additional signals, signals from the image recognizing section 20g.

The azimuth quality deciding section MH01 determines the azimuth quality by using the raised-posture and lowered-posture information of the front work implement 1 computed at the image recognizing section 20g, in addition to the information about the machine-body inclination angle acquired at the machine-body IMU 13. That is, if the postural information computed at the image recognizing section 20g represents that the front work implement 1 is in a raised posture, it is determined that the azimuth quality is inferior.

Note that in a case in which the management camera 33 set in the drone 34 is used, it becomes possible to acquire information about not only images of the hydraulic excavator 100 itself, but also images around the hydraulic excavator 100. In such a case, the azimuth quality computing section MH01 may calculate the azimuth quality while taking into consideration not only the postural information about the hydraulic excavator 100 itself, but also information about surrounding obstacles.

In addition, the image recognizing section 20g may compute not only the posture angle of the front work implement 1, but also the posture angle of the upper swing structure 2, and the azimuth quality computing section MHO may use the posture angle of the upper swing structure 2 also. It should be noted however that, since the posture angle in that case is postural information obtained through image processing, the determination precision of the azimuth quality is inferior to that by the machine-body IMU 13, and thus the posture angle is desirably used only as a backup.

The swing operation execution determining section MH03 also may use the postural information of the upper swing structure 2 acquired at the image recognizing section 20g. It should be noted however that, in this case also, since the precision of a determination of presence or absence of swing operation based on the postural information obtained through the image processing is inferior to that by the machine-body IMU 13, the postural information is desirably used only as a backup.

Note that while both the stereo camera 30 and the management camera 32 are used in the configuration of the hydraulic excavator 100 in FIG. 8, it is needless to say that the present invention can be executed with only one of them.

In this manner, according to the present embodiment, without using the boom IMU 14 or the machine-body IMU 13, it is possible to calculate an accurate azimuth of the upper swing structure 2 by using a GNSS regardless of postural changes in the hydraulic excavator 100 such as raising and lowering of the front work implement 1, and acquire the azimuth of the upper swing structure 2 with high precision and robustness.

In addition, when the postural information acquired at the image recognizing apparatus 35 is used as a backup of the boom IMU 14 or the machine-body IMU 13, the robustness as the system can be enhanced further, and the work efficiency can be enhanced.

Fourth Embodiment

Figure 17:
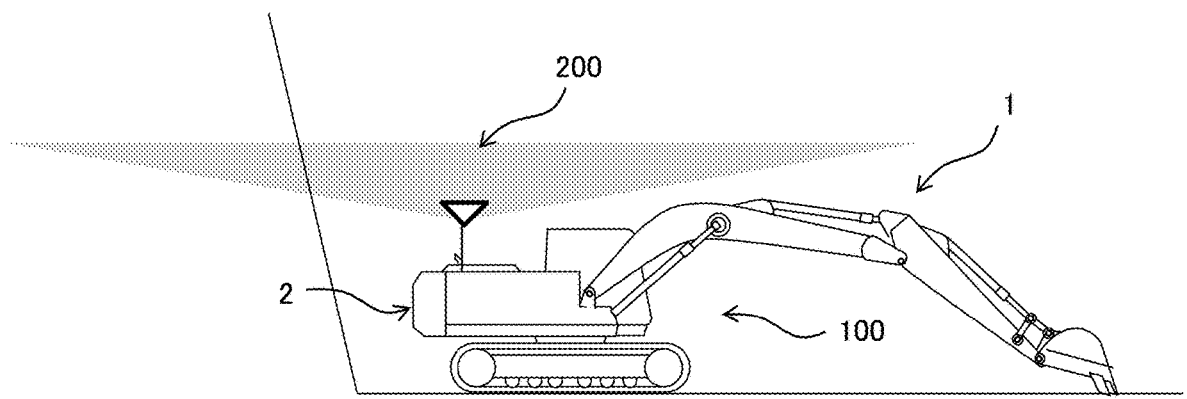
FIG. 17 is a figure depicting a satellite signal reception situation where there is a steep slope on the backside of the hydraulic excavator.

For example, in a work site in a mountainous area, there is a steep slope behind the hydraulic excavator 100 as depicted in FIG. 17 in some cases. In such situation, it is not possible to receive satellite signals on the backside of the hydraulic excavator 100, and thus the quality of the azimuth is deteriorated naturally.

A fourth embodiment of the present invention is made in view of such a situation.

First, the following schematically explains features of the present embodiment.

In the present embodiment, the controller 20: includes a terrain information storage apparatus 20g (see FIG. 11) storing terrain information around the hydraulic excavator 100 (construction machine) thereon; reads terrain information around the hydraulic excavator 100 (construction machine) stored on the terrain information storage apparatus 20g on the basis of the three-dimensional coordinates of the GNSS antennas 17a and 17b calculated by the GNSS receiver 17c; determines, in addition to or instead of the determination about the quality of the azimuth of the upper swing structure 2 based on the posture angle of the upper swing structure 2 acquired at the machine-body IMU 13 (machine-body posture angle acquiring apparatus) and the posture angle of the front work implement 1 acquired at the boom IMU 14 (front-implement posture angle acquiring apparatus), that the azimuth of the upper swing structure 2 calculated at the GNSS receiver 17c is of low quality when there is a possibility that the terrain around the hydraulic excavator 100 (construction machine) interrupts the satellite signal receivable area 200 of the GNSS antennas 17a and 17b; and executes the bias removal computation.

Figure 11:
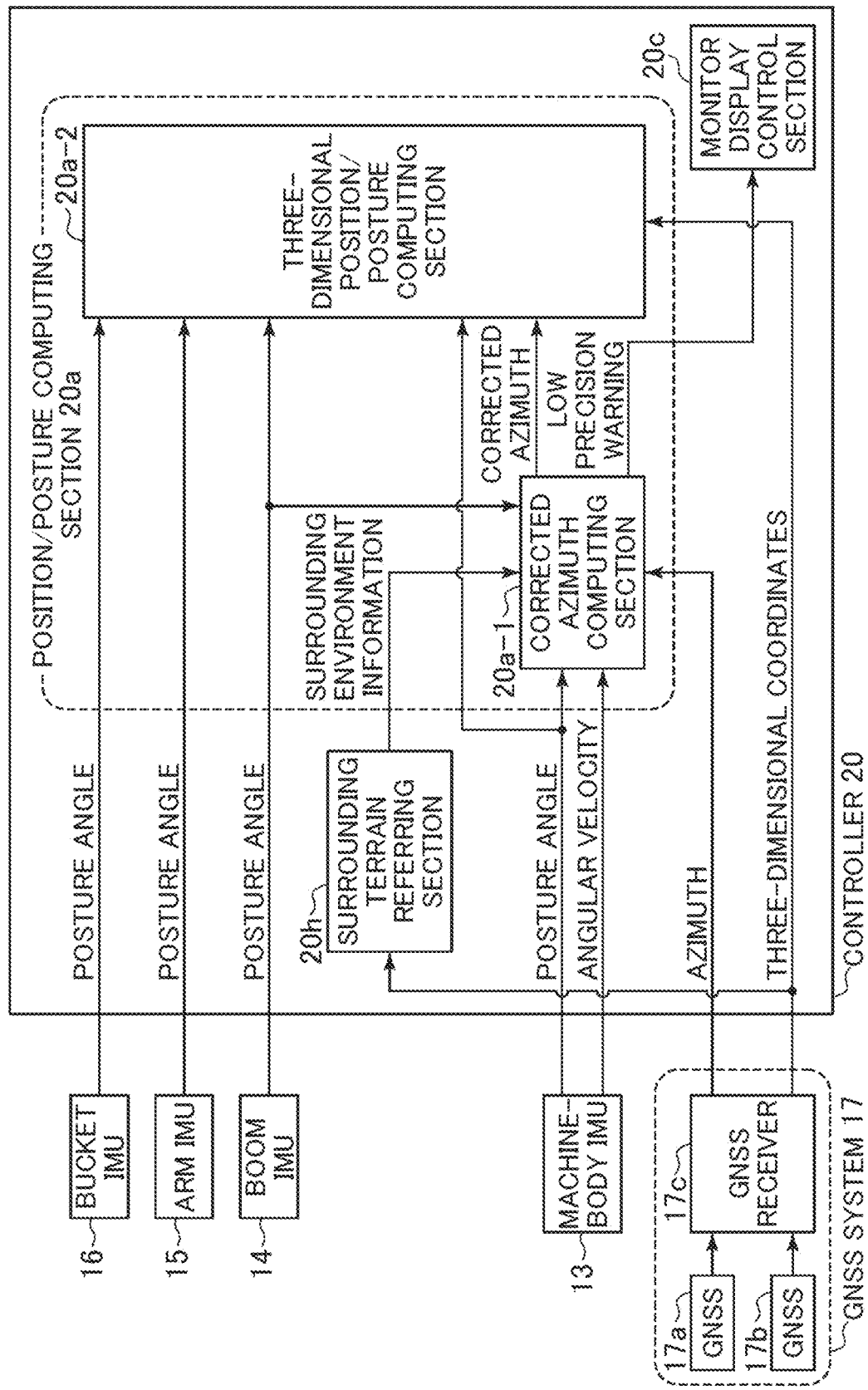
FIG. 11 is a block diagram depicting processing functionalities of the controller in a fourth embodiment of the present invention.

In the following, details of the processing contents of the controller 20 are explained on the basis of FIG. 11. FIG. 11 is a block diagram depicting processing functionalities of the controller 20 in the present embodiment.

In the present embodiment, the controller 20 further includes a surrounding terrain referring section 20h.

The surrounding terrain referring section 20h receives, as input, three-dimensional coordinate information about the GNSS antennas 17a and 17b acquired at the GNSS system 17, refers to terrain information around the hydraulic excavator, and outputs the terrain information that is referred to, to the corrected-azimuth computing section 20a-1.

Figure 12:
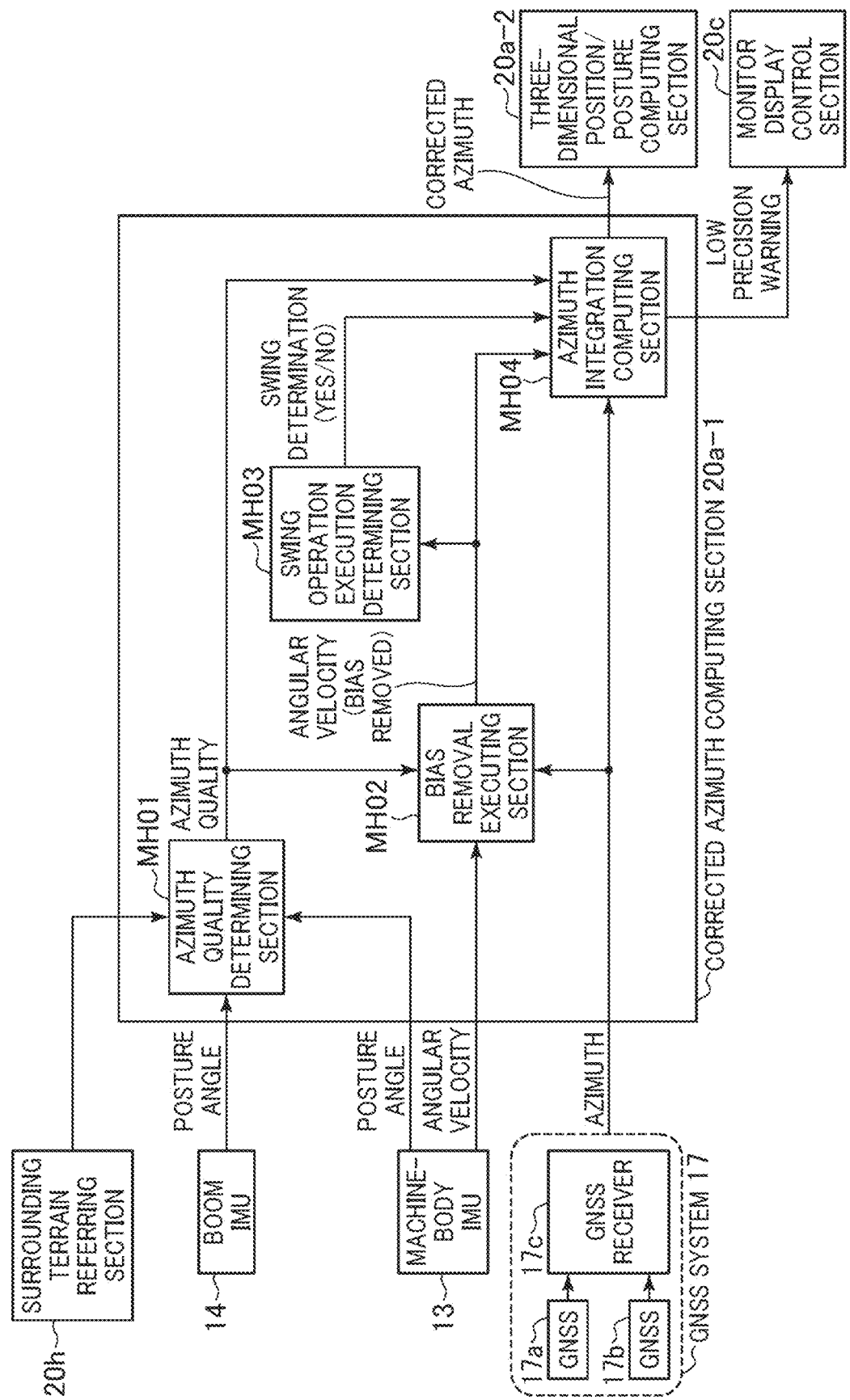
FIG. 12 is a block diagram depicting processing functionalities of the corrected-azimuth computing section in the fourth embodiment.

FIG. 12 is a block diagram depicting processing functionalities of the corrected-azimuth computing section 20a-1 in the present embodiment.

As depicted in FIG. 12, the corrected-azimuth computing section 20a-1 in the present embodiment has a feature in that it can determine the azimuth quality not only from postural information about the hydraulic excavator 100 (postural changes in the hydraulic excavator 100 such as raising and lowering of the front work implement 1), but also from terrain information around the hydraulic excavator 100. That is, when there is terrain (a steep slope in FIG. 17, etc.) that interrupts satellite signals around the position of the hydraulic excavator 100, it is determined that the azimuth quality is deteriorated regardless of the posture of the hydraulic excavator 100.

According to the present embodiment, regardless of postural changes in the hydraulic excavator 100 such as raising and lowering of the front work implement 1, and/or regardless of terrain around the hydraulic excavator 100, the azimuth of the upper swing structure 2 can be acquired with high precision and robustness, and the work efficiency can be enhanced.

Note that while the first to fourth embodiments are explained above, it is needless to mention that different configuration may be realized by combining any two or more of the embodiments, and the configuration also is within the scope of the present invention.

DESCRIPTION OF REFERENCE CHARACTERS

1: Front work implement
2: Upper swing structure
3: Lower travel structure
4: Boom
5: Arm
6: Bucket
9: Cabin
9a, 9b: Operation lever device
11: Monitor 13: Inertial measurement unit (machine-body IMU) (angular velocity acquiring apparatus) (machine-body posture angle acquiring apparatus) (machine-body inclination sensor)
14: Inertial measurement unit (boom IMU) (front-implement posture angle acquiring apparatus) (front-implement inclination sensor)
15: Inertial measurement unit (arm IMU) (front-implement posture angle acquiring apparatus)
16: Inertial measurement unit (bucket IMU) (front-implement posture angle acquiring apparatus)
17: GNSS system
17a, 17b: GNSS antenna
17c: GNSS receiver
20: Controller
20a: Position/posture computing section
20a-1: Corrected-azimuth computing section
20a-2: Three-dimensional position/posture computing section
20b: Construction target surface computing section
20c: Monitor display control section
20d: Hydraulic system control section
20e: Storage apparatus
20f: Storage apparatus
20g: Image recognizing section
20h: Surrounding terrain referring section
30: Stereo camera
31a: Wireless communication machine
31b: Wireless communication machine
31c: Wireless communication machine
32: Management camera
33: Camera
34: Unmanned aerial vehicle (drone)
35: Image recognizing apparatus
100: Hydraulic excavator
200: Satellite signal receivable area
Σm: Machine-body coordinate system
MH01: Azimuth quality determining section
MH02: Bias removal executing section
MH03: Swing operation determining section
MH04: Azimuth integration computing section

The invention claimed is:

1. A construction machine comprising:
a lower travel structure;
an upper swing structure that is swingable relative to the lower travel structure;
an articulated-type front work implement attached vertically rotatably relative to the upper swing structure;
a GNSS system having two GNSS antennas attached to the upper swing structure and a GNSS receiver that calculates three-dimensional coordinates of the GNSS antennas and an azimuth of the upper swing structure on a basis of a satellite signal received by the GNSS antennas;
an angular velocity acquiring apparatus that is attached to the upper swing structure and acquires an angular velocity of the upper swing structure;
a machine-body posture angle acquiring apparatus that is attached to the upper swing structure and acquires a posture angle of the upper swing structure;
a front-implement posture angle acquiring apparatus that acquires a posture angle of the front work implement; and
a controller,
the controller being configured to compute a position and posture of the front work implement on a basis of the three-dimensional coordinates of the GNSS antennas and the azimuth of the upper swing structure that are calculated at the GNSS receiver, the posture angle of the upper swing structure acquired at the machine-body posture angle acquiring apparatus, the angular velocity of the upper swing structure acquired at the angular velocity acquiring apparatus and the posture angle of the front work implement acquired at the front-implement posture angle acquiring apparatus, and control operation of the front work implement on a basis of the position and posture of the front work implement, wherein
the controller is further configured to
determine quality of the azimuth of the upper swing structure calculated at the GNSS receiver on a basis of at least one of the posture angle of the upper swing structure acquired at the machine-body posture angle acquiring apparatus and the posture angle of the front work implement acquired at the front-implement posture angle acquiring apparatus,
execute a bias removal computation of removing a gyro bias from the angular velocity of the upper swing structure acquired at the angular velocity acquiring apparatus on a basis of a result of the determination about the quality of the azimuth and the azimuth of the upper swing structure calculated at the GNSS receiver, and determine presence or absence of swing operation of the upper swing structure on a basis of the angular velocity of the upper swing structure from which the gyro bias has been removed, and
calculate a corrected azimuth of the upper swing structure on a basis of the azimuth of the upper swing structure calculated at the GNSS receiver, the angular velocity of the upper swing structure from which the gyro bias has been removed, and a result of the determination about swing operation of the upper swing structure, and compute the position and posture of the front work implement by using the corrected azimuth.

2. The construction machine according to claim 1, wherein
the machine-body posture angle acquiring apparatus is at least one machine-body inclination sensor attached to the upper swing structure,
the front-implement posture angle acquiring apparatus is at least one front-implement inclination sensor attached to the front work implement, and
the controller is configured to determine the quality of the azimuth of the upper swing structure calculated at the GNSS receiver on a basis of at least one of the posture angle of the upper swing structure sensed at the machine-body inclination sensor and the posture angle of the front work implement sensed at the front-implement inclination sensor, and execute the bias removal computation when it is determined that the quality of the azimuth of the upper swing structure is deteriorated.

3. The construction machine according to claim 1, further comprising:
an image recognizing apparatus as a posture angle acquiring apparatus of at least one of the machine-body posture angle acquiring apparatus and the front-implement posture angle acquiring apparatus, wherein
the image recognizing apparatus recognizes at least one of the posture angle of the upper swing structure and the posture angle of the front work implement on a basis of image information acquired from at least one camera, and the controller is configured to determine the quality of the azimuth of the upper swing structure calculated at the GNSS receiver on a basis of at least one of the posture angle of the upper swing structure and the posture angle of the front work implement recognized at the image recognizing apparatus, and execute the bias removal computation when it is determined that the quality of the azimuth of the upper swing structure is deteriorated.

4. The construction machine according to claim 1, wherein
the controller
includes a terrain information storage apparatus storing terrain information around the construction machine thereon, and
is configured to
read in terrain information around the construction machine stored on the terrain information storage apparatus on a basis of the three-dimensional coordinates of the GNSS antennas calculated by the GNSS receiver, and
determine, in addition to or instead of the determination about the quality of the azimuth of the upper swing structure based on the posture angle of the upper swing structure acquired at the machine-body posture angle acquiring apparatus and the posture angle of the front work implement acquired at the front-implement posture angle acquiring apparatus, that the azimuth of the upper swing structure calculated at the GNSS receiver is of low quality when there is a possibility that terrain around the construction machine interrupts a satellite signal receivable area of the GNSS antennas, and execute the bias removal computation.

5. The construction machine according to claim 1, wherein
the controller
includes an azimuth storage apparatus that stores an azimuth of the upper swing structure when the azimuth has been determined as being of high quality, and
is configured to compute the position and posture of the front work implement by using, as a corrected azimuth, an azimuth that is stored on the azimuth storage apparatus immediately before an azimuth of the upper swing structure is determined as being of low quality, when it is determined that the azimuth of the upper swing structure is of low quality and it is determined that there is no swing operation of the upper swing structure.

6. The construction machine according to claim 1, wherein
the controller is configured to notify a user that there is a possibility that precision of the azimuth of the upper swing structure is low when predetermined time period has elapsed while the quality of the azimuth of the upper swing structure has remained low after it is determined that the azimuth of the upper swing structure is of low quality and it is determined that there is swing operation of the upper swing structure.

7. The construction machine according to claim 1, further comprising:
a first operation lever device that gives an instruction for operation of the front work implement, wherein
the controller is configured to, when a determination is to be made about the quality of the azimuth of the upper swing structure calculated at the GNSS receiver, receive, as input, an operation signal of the first operation lever device as a backup of the posture angle of the front work implement acquired at the front-implement posture angle acquiring apparatus, and determine, on a basis of the operation signal of the first operation lever device, that the azimuth of the upper swing structure is of low quality when raising-direction operation of the front work implement by the first operation lever device is continued for predetermined time period or longer.

8. The construction machine according to claim 1, further comprising:
a second operation lever device that gives an instruction for operation of the upper swing structure, wherein
the controller is configured to, when a determination is to be made about presence or absence of swing operation of the upper swing structure, receive, as input, an operation signal of the second operation lever device as a backup of the angular velocity of the upper swing structure from which the gyro bias has been removed and determine, on a basis of the operation signal of the second operation lever device, that there is swing operation of the upper swing structure when a magnitude of the operation signal of the second operation lever device is equal to or larger than a predetermined value.

* * * * *